United States Patent
Yoshida et al.

(10) Patent No.: US 10,800,875 B2
(45) Date of Patent: Oct. 13, 2020

(54) METHACRYLIC RESIN AND PRODUCTION METHOD, MOLDED ARTICLE, AND OPTICAL OR AUTOMOTIVE COMPONENT OF SAME

(71) Applicant: ASAHI KASEI KABUSHIKI KAISHA, Chiyoda-ku, Tokyo (JP)

(72) Inventors: Junichi Yoshida, Tokyo (JP); Yutaka Tada, Tokyo (JP)

(73) Assignee: ASAHI KASEI KABUSHIKI KAISHA, Chiyoda-ku, Tokyo (JP)

(*) Notice: Subject to any disclaimer, the term of this patent is extended or adjusted under 35 U.S.C. 154(b) by 0 days.

(21) Appl. No.: 15/937,685

(22) Filed: Mar. 27, 2018

(65) Prior Publication Data
US 2019/0300646 A1 Oct. 3, 2019

(51) Int. Cl.
*C08G 61/12* (2006.01)
*C08F 222/40* (2006.01)
*C08F 226/06* (2006.01)

(52) U.S. Cl.
CPC ..... *C08G 61/124* (2013.01); *C08G 2261/124* (2013.01); *C08G 2261/228* (2013.01); *C08G 2261/3221* (2013.01); *C08G 2261/334* (2013.01); *C08G 2261/592* (2013.01)

(58) Field of Classification Search
CPC ............ C08G 61/124; C08G 2261/124; C08G 2261/228; C08G 2261/334; C08G 2261/592; C08G 2261/3221; C08F 222/40; C08F 226/06
See application file for complete search history.

(56) References Cited

U.S. PATENT DOCUMENTS

| | | | | |
|---|---|---|---|---|
| 5,430,115 A * | 7/1995 | Toyooka | ............... | C08F 222/40 526/262 |
| 8,822,614 B2 * | 9/2014 | Yonemura | ............. | C08F 222/40 526/258 |
| 10,174,145 B1 * | 1/2019 | Yoshida | ................ | C08F 212/08 |
| 2007/0049696 A1 * | 3/2007 | Gonzalez Montiel | .... | C08F 2/38 525/242 |
| 2013/0072651 A1 | 3/2013 | Yonemura et al. | | |

FOREIGN PATENT DOCUMENTS

| | | |
|---|---|---|
| JP | H05310853 A | 11/1993 |
| JP | H0912640 A | 1/1997 |
| JP | H09324016 A | 12/1997 |
| JP | H1045852 A | 2/1998 |
| JP | 2001233919 A | 8/2001 |
| JP | 4424636 B2 * | 3/2010 ............. C04B 51/04 |
| JP | 2013014659 A | 1/2013 |
| JP | 2018009141 A | 1/2018 |
| WO | 2011149088 A1 | 12/2011 |

* cited by examiner

*Primary Examiner* — Bijan Ahvazi
(74) *Attorney, Agent, or Firm* — Kenya IP Law PC

(57) ABSTRACT

Provided are a methacrylic resin having high heat resistance, highly controlled birefringence, and excellent color tone and transparency, and a production method, a molded article, and an optical or automotive component of the methacrylic resin. The methacrylic resin includes N-substituted maleimide monomer-derived structural units (B) in a main chain thereof in a proportion of 5 mass % to 40 mass %. The N-substituted maleimide monomer-derived structural units (B) include a structural unit represented by formula (1). The methacrylic resin has a glass transition temperature of higher than 120° C. and not higher than 160° C. The content of components that exhibit light absorption at a wavelength of 400 nm in methanol-soluble content of the methacrylic resin is more than 0 mass % and not more than 2 mass % as calculated in terms of N-phenylmaleimide.

16 Claims, No Drawings

METHACRYLIC RESIN AND PRODUCTION METHOD, MOLDED ARTICLE, AND OPTICAL OR AUTOMOTIVE COMPONENT OF SAME

TECHNICAL FIELD

This disclosure relates to a methacrylic resin having high heat resistance, highly controlled birefringence, and excellent color tone and transparency, and to a production method, a molded article, and an optical or automotive component of this methacrylic resin.

BACKGROUND

Methacrylic resins excel in terms of transparency, surface hardness, and the like while also having an optical property of low birefringence. Consequently, methacrylic resins have attracted attention in recent years as optical resins suitable for optical materials in various optical products such as liquid-crystal displays, plasma displays, organic EL displays, and other flat panel displays, small-scale infrared sensors, fine optical waveguides, microlenses, pick-up lenses and the like for DVDs and Blu-ray discs that handle short wavelength light, optical discs, optical films, light guide plates, diffuser plates, lenses, plastic substrates, and so forth, and the market for methacrylic resins is continuing to significantly expand.

In particular, methacrylic resins having cyclic structure-containing main chains and compositions containing such methacrylic resins are known to have excellent performance in terms of both heat resistance and optical properties (for example, refer to PTL 1), and demand for these resins and compositions thereof is rapidly increasing year by year. However, methacrylic resins including cyclic structure-containing main chains that have enhanced heat resistance and optical properties as described above sometimes suffer from problems resulting from the cyclic structure thereof, for example, such as coloring through absorption of visible region light and reduced transmittance. For this reason, methods of reducing the amount of unreacted cyclic monomer remaining in a methacrylic resin have been disclosed with the aim of obtaining a methacrylic resin including a cyclic structure-containing main chain that has little coloring and high transparency.

For example, PTL 2 proposes a method for reducing the amount of residual N-substituted maleimide monomer and obtaining a heat resistant methacrylic resin having excellent transparency and little coloring by, in a production method in which monomer components including an N-substituted maleimide (a) and a methacrylic acid ester (b) are used by supplying a portion of the monomer components, initiating polymerization, and subsequently supplying the remaining portion of the monomer components partway through polymerization, performing control such that the proportion constituted by the N-substituted maleimide (a) among unreacted monomer components present in the reaction system at the time at which supply of the monomer components is completed is lower than the proportion constituted by the N-substituted maleimide (a) among the total supplied amount of the monomer components.

Moreover, PTL 3 proposes a method in which polymerization is performed in the presence of a specific polymerization initiator such that, without using another polymerization initiator in combination therewith, the content of unreacted N-substituted maleimide in the resultant copolymer is low, and an N-substituted maleimide-containing methacrylic resin is obtained that has excellent heat resistance and little coloring.

Furthermore, PTL 4 proposes a method in which, with respect to a polymerization system of a methacrylic acid ester monomer and a maleimide monomer in which a sulfuric chain transfer agent such as a mercaptan is used, an acidic substance is provided in the reaction system such as to reduce the amount of residual maleimide monomer and the amount of maleimide monomer produced through heating in molding processing or the like, and suppress coloring.

In terms of other methods for obtaining methacrylic resins including cyclic structure-containing main chains that have little coloring, methods for limiting impurities present in raw materials and impurities produced in polymerization have also been disclosed.

For example, PTL 5 proposes a method in which monomer components including an N-substituted maleimide are polymerized in the presence of a non-radical polymerizable acid anhydride and/or a non-radical polymerizable carboxylic acid in order that an amine component present in the N-substituted maleimide as an impurity is converted to an amide through reaction with the non-radical polymerizable acid anhydride and/or the non-radical polymerizable carboxylic acid, which suppresses oxidative coloring.

Moreover, PTL 6 proposes a method in which a specific alcohol is added in polymerization to inhibit the production of impurities having coloring ability in a production method for a heat resistant acrylic resin in which a maleimide monomer is copolymerized.

CITATION LIST

Patent Literature

PTL 1: WO 2011/149088 A1
PTL 2: JP H9-324016 A
PTL 3: JP H9-12640 A
PTL 4: JP 2001-233919 A
PTL 5: JP H10-45852 A
PTL 6: JP H5-310853 A

SUMMARY

However, in recent years, applications of methacrylic resins have expanded from optical film applications to applications in thicker molded articles such as lenses and molded plates, and thus keen demand has developed for the provision of a resin that can display less coloring and higher transparency even in molded article applications having a long optical path length.

PTL 2, 3, and 4 propose solutions that focus on N-substituted maleimide used as a monomer, which has strong coloring ability, and focus on reducing the amount of residual N-substituted maleimide in a methacrylic resin and reducing the amount of N-substituted maleimide due to heat history such as molding processing as a method of reducing coloring.

However, the enhancement in terms of coloring and transparency is inadequate for providing a methacrylic resin that is capable of responding to the expanded use in molded article applications having a long optical path length such as described above, for example.

PTL 5 and 6 propose methods for inhibiting production of impurities having coloring ability by adding specific compounds in copolymerization. However, there are cases in which light transmittance in molded article applications having a long optical path length is reduced due to the influence of the added compound or a substance produced through a reaction with the added compound.

For these reasons, there is strong demand for further enhancement of coloring and transparency of methacrylic resins.

An objective of this disclosure is to provide a methacrylic resin having high heat resistance, highly controlled birefringence, and excellent color tone and transparency.

As a result of diligent studies conducted with the aim of solving the problems experienced by the conventional techniques set forth above, the inventors discovered that these problems can be solved by limiting specific components among oligomers with coloring ability included in methanol-soluble content of a methacrylic resin such as to achieve low coloring and high transparency even in a molded article having a long optical path length, for example. The inventors completed the present disclosure based on this discovery.

Specifically, this disclosure provides the following.

[1] A methacrylic resin comprising, in a main chain thereof, N-substituted maleimide monomer-derived structural units (B) in a proportion of 5 mass % to 40 mass %, wherein the N-substituted maleimide monomer-derived structural units (B) include a structural unit represented by formula (1)

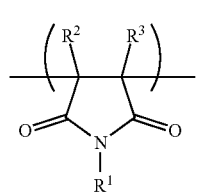

(1)

where, in formula (1), $R^1$ represents an arylalkyl group having a carbon number of 7 to 14 or an aryl group having a carbon number of 6 to 14, $R^2$ and $R^3$ each represent, independently of one another, a hydrogen atom, an alkyl group having a carbon number of 1 to 12, or an aryl group having a carbon number of 6 to 14, and in a case in which $R^2$ is an aryl group, $R^2$ may include a halogen as a substituent, the methacrylic resin has a glass transition temperature of higher than 120° C. and not higher than 160° C., and content of components that exhibit light absorption at a wavelength of 400 nm in methanol-soluble content of the methacrylic resin is more than 0 mass % and not more than 2 mass % as calculated in terms of N-phenylmaleimide.

[2] The methacrylic resin according to the foregoing [1], wherein content of components having a molecular weight of 2,000 or less in the methanol-soluble content of the methacrylic resin is 40 mass % or less.

[3] The methacrylic resin according to the foregoing [1] or [2], further comprising, in the main chain thereof, methacrylic acid ester monomer units (A) in a proportion of 50 mass % to 95 mass % and other vinyl monomer units (C) that are copolymerizable with a methacrylic acid ester monomer in a proportion of 0 mass % to 20 mass % relative to 100 mass % of the methacrylic resin.

[4] The methacrylic resin according to the foregoing [3], wherein the (B) structural units are included in a proportion of 45 mass % to 100 mass % relative to 100 mass %, in total, of the (B) structural units and the (C) monomer units.

[5] The methacrylic resin according to the foregoing [3] or [4], wherein the (C) monomer units include a structural unit of at least one selected from the group consisting of an acrylic acid ester monomer, an aromatic vinyl monomer, and a vinyl cyanide monomer.

[6] The methacrylic resin according to any one of the foregoing [1] to [5], having a photoelastic coefficient of $-2\times10^{-12}$ $Pa^{-1}$ to $+2\times10^{-12}$ $Pa^{-1}$.

[7] A production method for a methacrylic resin, comprising performing radical polymerization, in a solvent, of two or more monomer components including a methacrylic acid ester monomer and an N-substituted maleimide monomer, wherein the N-substituted maleimide monomer includes an N-substituted maleimide monomer that is N-substituted with an aryl group or an arylalkyl group, the N-substituted maleimide monomer has a final conversion rate of 97% or more, and the methacrylic acid ester monomer has a final conversion rate of 88% to 96%.

[8] The production method according to the foregoing [7], wherein the N-substituted maleimide monomer and a portion of the methacrylic acid ester monomer are copolymerized and a remaining portion of the methacrylic acid ester monomer is added at a stage at which the methacrylic acid ester monomer has a conversion rate of 80% to 95%.

[9] A molded article comprising the methacrylic resin according to any one of the foregoing [1] to [6] or a methacrylic resin composition containing the methacrylic resin according to any one of the foregoing [1] to [6].

[10] A molded article comprising a methacrylic resin obtained through the production method according to the foregoing [7] or [8] or a methacrylic resin composition containing a methacrylic resin obtained through the production method according to the foregoing [7] or [8].

[11] An optical or automotive component comprising the molded article according to the foregoing [9] or [10].

According to this disclosure, it is possible to provide a methacrylic resin having high heat resistance, highly controlled birefringence, and excellent color tone and transparency.

DETAILED DESCRIPTION

The following provides a detailed description of a presently disclosed embodiment (hereinafter, referred to as the "present embodiment"). However, the present disclosure is not limited by the following description and may be implemented with various alterations within the essential scope thereof.

(Methacrylic Resin)

A methacrylic resin according to the present embodiment includes methacrylic acid ester monomer units (A) and N-substituted maleimide monomer-derived structural units (B), and may optionally include other vinyl monomer units (C) that are copolymerizable with a methacrylic acid ester monomer.

The following describes these monomer structural units.

—Methacrylic Acid Ester Monomer-Derived Structural Units (A)—

First, the methacrylic acid ester monomer-derived structural units (A) are described.

The methacrylic acid ester monomer-derived structural units (A) may, for example, be formed from a monomer selected from the methacrylic acid esters listed below.

Examples of methacrylic acid esters that may be used include methyl methacrylate, ethyl methacrylate, n-propyl methacrylate, isopropyl methacrylate, n-butyl methacrylate, isobutyl methacrylate, t-butyl methacrylate, 2-ethylhexyl methacrylate, cyclopentyl methacrylate, cyclohexyl methacrylate, cyclooctyl methacrylate, tricyclodecyl methacrylate, dicyclooctyl methacrylate, tricyclododecyl methacrylate, isobornyl methacrylate, phenyl methacrylate, benzyl methacrylate, 1-phenylethyl methacrylate, 2-phenoxyethyl methacrylate, 3-phenylpropyl methacrylate, and 2,4,6-tribromophenyl methacrylate.

One of these monomers may be used individually, or two or more of these monomers may be used together.

Of these methacrylic acid esters, methyl methacrylate and benzyl methacrylate are preferable in terms that the obtained methacrylic resin has excellent transparency and weather resistance.

The methacrylic resin may include one type of methacrylic acid ester monomer-derived structural unit (A), or may include two or more types of methacrylic acid ester monomer-derived structural units (A).

The content of the methacrylic acid ester monomer-derived structural units (A) relative to 100 mass % of the methacrylic resin is preferably 50 mass % to 95 mass %, more preferably 60 mass % to 93 mass %, and even more preferably 70 mass % to 90 mass % from a viewpoint of providing the methacrylic resin with sufficient heat resistance through the subsequently described N-substituted maleimide monomer-derived structural units (B).

The following describes the N-substituted maleimide monomer-derived structural units (B).

—N-Substituted Maleimide Monomer-Derived Structural Units (B)—

Next, the N-substituted maleimide monomer-derived structural units (B) are described.

N-substituted maleimide monomer forming the N-substituted maleimide monomer-derived structural units (B) includes a monomer that forms a structural unit represented by the following formula (1) as an essential component, and is preferably formed from both a monomer that forms a structural unit represented by formula (1) and a monomer that forms a structural unit represented by the following formula (2).

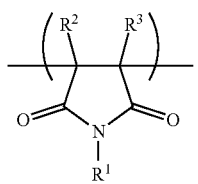

(1)

In formula (1), $R^1$ represents an arylalkyl group having a carbon number of 7 to 14 or an aryl group having a carbon number of 6 to 14, and $R^2$ and $R^3$ each represent, independently of one another, a hydrogen atom, an alkyl group having a carbon number of 1 to 12, or an aryl group having a carbon number of 6 to 14.

Moreover, in a case in which $R^2$ is an aryl group, $R^2$ may include a halogen as a substituent.

Furthermore, $R^1$ may be substituted with a substituent such as a halogen atom, an alkyl group having a carbon number of 1 to 6, an alkoxy group having a carbon number of 1 to 6, a nitro group, or a benzyl group.

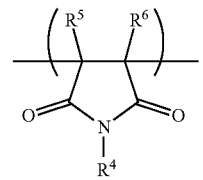

(2)

In formula (2), R represents a hydrogen atom, a cycloalkyl group having a carbon number of 3 to 12, or an alkyl group having a carbon number of 1 to 18, and $R^5$ and $R^6$ each represent, independently of one another, a hydrogen atom, an alkyl group having a carbon number of 1 to 12, or an aryl group having a carbon number of 6 to 14.

Specific examples are as follows.

Examples of monomers that form a structural unit represented by formula (1) include N-phenylmaleimide, N-benzylmaleimide, N-(2-chlorophenyl)maleimide, N-(4-chlorophenyl)maleimide, N-(4-bromophenyl)maleimide, N-(2-methylphenyl)maleimide, N-(2-ethylphenyl)maleimide, N-(2-methoxyphenyl)maleimide, N-(2-nitrophenyl)maleimide, N-(2,4,6-trimethylphenyl)maleimide, N-(4-benzylphenyl)maleimide, N-(2,4,6-tribromophenyl)maleimide, N-naphthylmaleimide, N-anthracenylmaleimide, 3-methyl-1-phenyl-1H-pyrrole-2,5-dione, 3,4-dimethyl-1-phenyl-1H-pyrrole-2,5-dione, 1,3-diphenyl-1H-pyrrole-2,5-dione, and 1,3,4-triphenyl-1H-pyrrole-2,5-dione.

Of these monomers, N-phenylmaleimide and N-benzylmaleimide are preferable in terms that the obtained methacrylic resin has excellent heat resistance and optical properties such as birefringence.

One of these monomers may be used individually, or two or more of these monomers may be used together.

Examples of monomers that form a structural unit represented by formula (2) include N-methylmaleimide, N-ethylmaleimide, N-n-propylmaleimide, N-isopropylmaleimide, N-n-butylmaleimide, N-isobutylmaleimide, N-s-butylmaleimide, N-t-butylmaleimide, N-n-pentylmaleimide, N-n-hexylmaleimide, N-n-heptylmaleimide, N-n-octylmaleimide, N-laurylmaleimide, N-stearylmaleimide, N-cyclopentylmaleimide, N-cyclohexylmaleimide, 1-cyclohexyl-3-methyl-1H-pyrrole-2,5-dione, 1-cyclohexyl-3,4-dimethyl-1H-pyrrole-2,5-dione, 1-cyclohexyl-3-phenyl-1H-pyrrole-2,5-dione, and 1-cyclohexyl-3,4-diphenyl-1H-pyrrole-2,5-dione.

Of these monomers, N-methylmaleimide, N-ethylmaleimide, N-isopropylmaleimide, and N-cyclohexylmaleimide are preferable in terms of providing the methacrylic resin with excellent weather resistance, and N-cyclohexylmaleimide is particularly preferable in terms of providing the excellent low hygroscopicity demanded in optical materials in recent years.

One of these monomers may be used individually, or two or more of these monomers may be used together.

In the methacrylic resin according to the present embodiment, a monomer that forms a structural unit represented by formula (1) is used and a monomer that forms a structural unit represented by formula (2) is preferably used therewith in order to achieve highly controlled birefringence properties.

The molar ratio (B1/B2) of the content (B1) of structural units represented by formula (1) relative to the content (B2) of structural units represented by formula (2) is preferably more than 0 and not more than 15, and more preferably more than 0 and not more than 10.

When the molar ratio B1/B2 is within any of the ranges set forth above, good heat resistance and good photoelastic properties can be achieved while maintaining transparency of the methacrylic resin according to the present embodiment, without yellowing or loss of environment resistance.

Although the content of N-substituted maleimide monomer-derived structural units (B) is not specifically limited so long as the resultant composition satisfies the glass transition temperature range according to the present embodiment, the content of N-substituted maleimide monomer-derived structural units (B) relative to 100 mass % of the methacrylic resin is within a range of 5 mass % to 40 mass %, preferably within a range of 5 mass % to 30 mass %, and more preferably within a range of 7 mass % to 25 mass %.

When the content of N-substituted maleimide monomer-derived structural units (B) is within any of the ranges set forth above, a more sufficient heat resistance enhancement effect can be obtained with respect to the methacrylic resin and a more preferable enhancement effect can be obtained in terms of weather resistance, low water absorbency, and optical properties. Note that setting the content of N-substituted maleimide monomer-derived structural units as 40 mass % or less is effective for preventing reduction of physical properties of the methacrylic resin caused by a decrease in reactivity of monomer components in polymerization reaction and an increase in the amount of unreacted residual monomer.

The content of structural units (B1) represented by formula (1) relative to 100 mass % of the methacrylic resin is preferably within a range of 3 mass % to 30 mass %, more preferably within a range of 5 mass % to 25 mass %, and even more preferably within a range of 7 mass % to 20 mass % in terms that the obtained methacrylic resin has excellent heat resistance and optical properties such as birefringence.

—Other Vinyl Monomer Units (C) Copolymerizable with Methacrylic Acid Ester Monomer—

Examples of other vinyl monomer units (C) copolymerizable with a methacrylic acid ester monomer that may be included in the methacrylic resin according to the present embodiment (hereinafter, also referred to as (C) monomer units) include aromatic vinyl monomer units (C-1), acrylic acid ester monomer units (C-2), vinyl cyanide monomer units (C-3), and other monomer units (C-4).

The other vinyl monomer units (C) that are copolymerizable with a methacrylic acid ester monomer may be one type of monomer unit used individually, or two or more types of monomer units used in combination.

An appropriate material for the (C) monomers units may be selected in accordance with the properties demanded of the methacrylic resin according to the present embodiment. However, in a case in which properties such as thermal stability, fluidity, mechanical properties, and chemical resistance are particularly necessary, the (C) monomer units may suitably be one or more types of monomer units selected from aromatic vinyl monomer units (C-1), acrylic acid ester monomer units (C-2), and vinyl cyanide monomer units (C-3).

[Aromatic Vinyl Monomer Units (C-1)]

Although no specific limitations are placed on monomers that may form aromatic vinyl monomer units (C-1) included in the methacrylic resin according to the present embodiment, an aromatic vinyl monomer represented by the following general formula (4) is preferable.

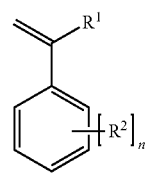

(4)

In general formula (4), $R^1$ represents a hydrogen atom or an alkyl group having a carbon number 1 to 6. The alkyl group may, for example, be substituted with a hydroxy group.

$R^2$ represents one selected from the group consisting of a hydrogen atom, an alkyl group having a carbon number of 1 to 12, an alkoxy group having a carbon number of 1 to 12, an aryl group having a carbon number of 6 to 8, and an aryloxy group having a carbon number of 6 to 8. Each $R^2$ may represent the same group or may represent different groups. Moreover, $R^2$ groups may form a cyclic structure together.

Furthermore, n represents an integer of 0 to 5.

Specific examples of monomers represented by general formula (4) include, but are not specifically limited to, styrene, o-methylstyrene, m-methylstyrene, p-methylstyrene, 2,4-dimethylstyrene, 2,5-dimethyl styrene, 3,4-dimethylstyrene, 3,5-dimethylstyrene, p-ethylstyrene, m-ethylstyrene, o-ethylstyrene, p-tert-butylstyrene, 1-vinylnaphthalene, 2-vinylnaphthalene, 1,1-diphenylethylene, isopropenylbenzene (α-methylstyrene), isopropenyltoluene, isopropenylethylbenzene, isopropenylpropylbenzene, isopropenylbutylbenzene, isopropenylpentylbenzene, isopropenylhexylbenzene, and isopropenyloctylbenzene.

Of these monomers, styrene and isopropenylbenzene are preferable, and styrene is more preferable from a viewpoint of imparting fluidity, reducing unreacted monomer through improvement of the polymerization conversion rate, and so forth.

These monomers may be selected as appropriate in accordance with the properties demanded of the methacrylic resin according to the present embodiment.

In a case in which aromatic vinyl monomer units (C-1) are used, the content thereof relative to 100 mass %, in total, of the (A) monomer units and the (B) structural units is preferably 23 mass % or less, more preferably 20 mass % or less, even more preferably 18 mass % or less, further preferably 15 mass % or less, and even further preferably 10 mass % or less in consideration of the balance of heat resistance, reduction of residual monomer species, and fluidity.

In a case in which aromatic vinyl monomer units (C-1) are used in combination with the previously described N-substituted maleimide structural units (B), the ratio (mass ratio) of the content of the (C-1) monomer units relative to the content of the (B) structural units (i.e., (C-1) content/(B) content) is preferably 0.3 to 5 from a viewpoint of processing fluidity in molding processing of a film, an effect of silver streak reduction through reduction of residual monomer, and so forth.

The upper limit for this ratio is preferably 5 or less, more preferably 3 or less, and even more preferably 1 or less from a viewpoint of obtaining good color tone and retaining heat resistance. Moreover, the lower limit for this ratio is preferably 0.3 or more, and more preferably 0.4 or more from a viewpoint of reducing residual monomer.

The above-described aromatic vinyl monomer units (C-1) may be one type of monomer used individually, or two or more types of monomers used in combination.

[Acrylic Acid Ester Monomer Units (C-2)]

Although no specific limitations are placed on monomers that may form acrylic acid ester monomer units (C-2) included in the methacrylic resin according to the present embodiment, an acrylic acid ester monomer represented by the following general formula (5) is preferable.

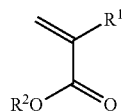

(5)

In general formula (5), $R^1$ represents a hydrogen atom or an alkoxy group having a carbon number of 1 to 12 and $R^2$ represents an alkyl group having a carbon number of 1 to 18, a cycloalkyl group having a carbon number of 3 to 12, or an aryl group having a carbon number of 6 to 14.

The monomer used to form the acrylic acid ester monomer units (C-2) is preferably methyl acrylate, ethyl acrylate, n-propyl acrylate, n-butyl acrylate, sec-butyl acrylate, 2-ethylhexyl acrylate, cyclohexyl acrylate, phenyl acrylate, or the like, and more preferably methyl acrylate, ethyl acrylate, or n-butyl acrylate from a viewpoint of increasing weather resistance, heat resistance, fluidity, and thermal stability in a methacrylic resin according to the present embodiment that is for a film, and is even more preferably methyl acrylate or ethyl acrylate from a viewpoint of ease of acquisition.

The acrylic acid ester monomer units (C-2) may be one type of monomer unit used individually, or two or more types of monomer units used together.

In a case in which acrylic acid ester monomer units (C-2) are used, the content thereof relative to 100 mass %, in total, of the (A) monomer units and the (B) structural units is preferably 5 mass % or less, and more preferably 3 mass % or less from a viewpoint of heat resistance and thermal stability.

[Vinyl Cyanide Monomer Units (C-3)]

Although no specific limitations are placed on monomers that may form vinyl cyanide monomer units (C-3) included in the methacrylic resin according to the present embodiment, examples of such monomers include acrylonitrile, methacrylonitrile, and vinylidene cyanide. Of these monomers, acrylonitrile is preferable from a viewpoint of ease of acquisition and imparting chemical resistance.

The vinyl cyanide monomer units (C-3) may be one type of monomer unit used individually, or two or more types of monomer units used together.

In a case in which vinyl cyanide monomer units (C-3) are used, the content thereof relative to 100 mass %, in total, of the (A) monomer units and the (B) structural units is preferably 15 mass % or less, more preferably 12 mass % or less, and even more preferably 10 mass % or less from a viewpoint of solvent resistance and heat resistance retention.

[Monomer Units (C-4) Other than (C-1) to (C-3)]

Although no specific limitations are placed on monomers that may form monomer units (C-4) other than (C-1) to (C-3) included in the methacrylic resin according to the present embodiment, examples of such monomers include amides such as acrylamide and methacrylamide; monomers obtained through esterification of acrylic acid or methacrylic acid with both terminal hydroxy groups of ethylene glycol or an oligomer thereof such as ethylene glycol di(meth)acrylate, diethylene glycol di(meth)acrylate, triethylene glycol di(meth)acrylate, and tetraethylene glycol di(meth)acrylate; monomers obtained through esterification of acrylic acid or methacrylic acid with two alcohol hydroxy groups such as neopentyl glycol di(meth)acrylate and di(meth)acrylates; monomers obtained through esterification of acrylic acid or methacrylic acid with a polyhydric alcohol derivative such as trimethylolpropane or pentaerythritol; and polyfunctional monomers such as divinylbenzene.

Of the above-described monomers that may form the (C) monomer units, at least one selected from the group consisting of methyl acrylate, ethyl acrylate, styrene, and acrylonitrile is preferable from a viewpoint of ease of acquisition.

The content of other vinyl monomer units (C) that are copolymerizable with a methacrylic acid ester monomer relative to 100 mass % of the methacrylic resin is preferably 0 mass % to 20 mass %, more preferably 0 mass % to 18 mass %, and even more preferably 0 mass % to 15 mass % from a viewpoint of increasing the effect of imparting heat resistance through the (B) structural units.

Particularly in a case in which a crosslinkable polyfunctional (meth)acrylate including a plurality of reactive double bonds is used for the (C) monomer units, the content of the (C) monomer units is preferably 0.5 mass % or less, more preferably 0.3 mass % or less, and even more preferably 0.2 mass % or less from a viewpoint of polymer fluidity.

Moreover, the content of the (B) structural units relative to 100 mass %, in total, of the (B) structural units and the (C) monomer units in the present embodiment is preferably 45 mass % to 100 mass %, particularly from a viewpoint of heat resistance and optical properties of the methacrylic resin. In such a situation, the content of the (C) structural units is preferably 0 mass % to 55 mass %. Moreover, the content of the (B) structural units is more preferably 50 mass % to 100 mass %, even more preferably 50 mass % to 90 mass %, and further preferably 50 mass % to 80 mass %.

The following describes properties of the methacrylic resin according to the present embodiment.

The glass transition temperature (Tg) of the methacrylic resin according to the present embodiment is higher than 120° C. and not higher than 160° C.

As a result of the glass transition temperature of the methacrylic resin being higher than 120° C., it is easier to adequately obtain the heat resistance that has been required in recent years for optical components such as lens molded articles and liquid-crystal display light guide plates, automotive components, and film molded article optical films for liquid-crystal displays. The glass transition temperature (Tg) is more preferably 125° C. or higher, and even more preferably 130° C. or higher from a viewpoint of dimensional stability at temperatures in the environment of use of the methacrylic resin.

On the other hand, as a result of the glass transition temperature (Tg) of the methacrylic resin being 160° C. or lower, it is possible to avoid melt processing at extremely high temperature, inhibit thermal decomposition of resin and the like, and obtain a good product. The glass transition temperature (Tg) is preferably 150° C. or lower for the same reason.

The glass transition temperature (Tg) can be determined through measurement in accordance with JIS-K7121. Specifically, the glass transition temperature (Tg) can be measured by a method described in the subsequent EXAMPLES section.

The content of components that exhibit light absorption at a wavelength of 400 nm in methanol-soluble content of the methacrylic resin according to the present embodiment is more than 0 mass % and not more than 2 mass %, preferably at least 0.1 mass % and not more than 1.5 mass %, and more preferably at least 0.1 mass % and not more than 1 mass %.

As a result of the proportion constituted by components that exhibit light absorption at a wavelength of 400 nm being 2 mass % or less, it is possible to obtain a molded article that has good color tone and is suitable for optical applications. On the other hand, the complete removal of components that exhibit light absorption at a wavelength of 400 nm is unrealistic in view of productivity.

The content of components that exhibit light absorption at a wavelength of 400 nm is determined in terms of N-phenylmaleimide as described below. First, a molecular weight distribution of methanol-soluble content is measured by gel permeation chromatography (GPC) using a UV detector set to a wavelength of 400 nm as a detector, and the total peak area is determined. GPC measurement of phenylmaleimide using a 400 nm detector is separately performed to prepare a calibration curve of sample concentration and peak area. The calibration curve is then used to determine the amount of components that exhibit light absorption at 400 nm in the methanol-soluble content as an amount calculated in terms of N-phenylmaleimide, and the content (mass % in terms of N-phenylmaleimide) of components that exhibit light absorption at a wavelength of 400 nm is determined from the ratio relative to the mass of the methanol-soluble content. A more detailed description is provided in the subsequent EXAMPLES section.

Note that "methanol-soluble content" and "methanol-insoluble content" are obtained by preparing a chloroform solution of the methacrylic resin, subsequently dripping the chloroform solution into methanol to perform reprecipitation, separating a filtrate and a filtration residue, and then drying the filtrate and the filtration residue. Specifically, the methanol-soluble content and the methanol-insoluble content can be obtained by a method described in the subsequent EXAMPLES section.

In the methanol-soluble content of the methacrylic resin according to the present embodiment, the content of components having a molecular weight of 2,000 or less is preferably 40 mass % or less, more preferably 30 mass % or less, and even more preferably 20 mass % or less.

When the amount of components having a molecular weight of 2,000 or less in the methanol-soluble content is 40 mass % or less, a molded article having good color tone can be obtained and problems in molding such as cast roll staining in film shaping and formation of silver streaks in injection molding can be inhibited.

The amount of components having a molecular weight of 2,000 or less can be determined by measuring the methanol-soluble content by GPC using an RI detector and performing calculation using the ratio of the elution area for molecular weights of 2,000 and less relative to the total peak area. Specifically, the amount of components having a molecular weight of 2,000 or less can be obtained by a method described in the subsequent EXAMPLES section.

The amount of methanol-soluble content in the methacrylic resin according to the present embodiment as a proportion relative to 100 mass %, in total, of methanol-soluble content and methanol-insoluble content is preferably more than 0 mass % and not more than 5 mass %, more preferably more than 0 mass % and not more than 4 mass %, even more preferably at least 0.1 mass % and not more than 3.5 mass %, and further preferably at least 0.1 mass % and not more than 3 mass %.

When the proportion constituted by soluble content is 5 mass % or less, problems in molding such as cast roll staining in film shaping and the formation of silver streaks in injection molding can be inhibited. On the other hand, the complete removal of soluble content is unrealistic in view of productivity.

The weight average molecular weight (Mw) of the methacrylic resin according to the present embodiment as measured in terms of polymethyl methacrylate by gel permeation chromatography (GPC) is preferably within a range of 65,000 to 300,000, more preferably within a range of 100,000 to 220,000, and even more preferably within a range of 120,000 to 180,000.

An excellent balance of mechanical strength and fluidity can be obtained when the weight average molecular weight (Mw) is within any of the ranges set forth above.

The ratio of weight average molecular weight (Mw) and number average molecular weight (Mn) serves as a parameter expressing molecular weight distribution. In the case of the methacrylic resin according to the present embodiment, this ratio Mw/Mn is preferably 1.5 to 3.0, more preferably 1.6 to 2.5, and even more preferably 1.6 to 2.3 in consideration of the balance of fluidity and mechanical strength.

The weight average molecular weight and the number average molecular weight of the methacrylic resin can be measured by a method described in the subsequent EXAMPLES section.

The absolute value of the photoelastic coefficient $C_R$ of the methacrylic resin according to the present embodiment is preferably $3.0 \times 10^{-12}$ $Pa^{-1}$ or less, more preferably $2.0 \times 10^{-12}$ $Pa^{-1}$ or less, and even more preferably $1.0 \times 10^{-12}$ $Pa^{-1}$ or less.

The photoelastic coefficient is described in various documents (for example, refer to Review of Chemistry, No. 39, 1998 (published by Japan Scientific Societies Press)) and is defined by the following formulae (i-a) and (i-b). The closer the value of the photoelastic coefficient $C_R$ is to zero, the smaller the change in birefringence caused by external force.

$$C_R = |\Delta n|/\sigma_R \tag{i-a}$$

$$|\Delta n| = |nx - ny| \tag{i-b}$$

(In the above formulae, $C_R$ represents the photoelastic coefficient, $\sigma_R$ represents tensile stress, $|\Delta n|$ represents the absolute value of birefringence, nx represents the refractive index of the tension direction and ny represents the refractive index of an in-plane direction that is perpendicular to the tension direction.)

When the absolute value of the photoelastic coefficient $C_R$ of the methacrylic resin according to the present embodiment is $3.0 \times 10^{-12}$ $Pa^{-1}$ or less, in a situation in which the methacrylic resin is formed into a film and used in a liquid-crystal display, it is possible to inhibit or prevent phase difference irregularity, reduced contrast at the periphery of the display screen, and light leakage.

The photoelastic coefficient $C_R$ can, more specifically, be determined by a method described in the subsequent EXAMPLES section.

(Methacrylic Resin Production Method)

The following describes a methacrylic resin production method according to the present embodiment.

The methacrylic resin production method is described below in detail.

A solution polymerization method is used as the methacrylic resin production method according to the present embodiment.

The mode of polymerization in the production method according to the present embodiment may be a semi-batch process or a continuous process. The term "semi-batch process" refers to a process in which one of raw material feeding and product collection is performed while a reaction is proceeding. The methacrylic resin production method according to the present embodiment is preferably a semi-batch process in which part of raw material feeding is performed after a reaction has started.

Moreover, the production method according to the present embodiment may involve connecting a plurality of reactors in series, performing polymerization continuously by a method in which an initiator and monomers including an N-substituted maleimide monomer and a portion of a methacrylic acid ester monomer are fed continuously into a first reactor and reaction liquid at an outlet of the first reactor is fed to a subsequent reactor, and performing polymerization by a method in which supplemental addition of a remaining portion of the methacrylic acid ester monomer is performed at a second or subsequent reactor at which the conversion rate of the methacrylic acid ester monomer has reached 80% to 95%.

In the production method according to the present embodiment, polymerization of monomers by radical polymerization is adopted.

The following provides a detailed description of a suitable production method for the methacrylic resin according to the present embodiment.

In the suitable production method for the methacrylic resin according to the present embodiment, when radical polymerization of two or more monomer components including an N-substituted maleimide monomer and a methacrylic acid ester monomer is performed in a solvent, an N-substituted maleimide monomer that is N-substituted with an aryl group or an arylalkyl group is included among the N-substituted maleimide monomer.

The final conversion rate of the N-substituted maleimide monomer is set as 97% or more and the final conversion rate of the methacrylic acid ester monomer is set as at least 88% and not more than 96%.

The final conversion rate of the N-substituted maleimide monomer is 97% or more, preferably 98% or more, and more preferably 99% or more.

The final conversion rate of the methacrylic acid ester monomer is 88% to 96%, preferably 90% to 95%, and more preferably 90% to 94%.

By performing polymerization in a manner such that the final conversion rates of methacrylic acid ester and N-substituted maleimide are within any of the ranges set forth above, the content of components that exhibit light absorption at a wavelength of 400 nm in methanol-soluble content can be restricted and a methacrylic resin molded article having good color tone can be obtained. In radical copolymerization of a methacrylic acid ester monomer and an N-substituted maleimide monomer, the rate at which the methacrylic acid ester monomer is consumed is normally faster than the rate at which the N-substituted maleimide monomer is consumed, and thus the conversion rate of the methacrylic acid ester monomer tends to rise. The inventors conducted a detailed investigation in relation to the amount of coloring components present in methanol-soluble content during polymerization and, as a result, discovered that in a situation in which a large amount of the N-substituted maleimide monomer remains at a point at which the polymerization conversion rate has increased and the monomer concentration has fallen, production of oligomers having coloring ability is promoted, which has a negative impact on color tone of the resultant methacrylic resin. Moreover, the inventors discovered that production of oligomers having coloring ability can be inhibited by increasing the concentration of the methacrylic acid ester monomer in the final stage of polymerization and restricting the final conversion rate of the methacrylic acid ester monomer to 96% or less while also raising the final conversion rate of the N-substituted maleimide monomer to 97% or more. The inventors also found that it is important that the conversion rate of the methacrylic acid ester monomer is 88% or more because if the residual amount of the methacrylic acid ester monomer is large, the burden of a devolatilization step increases, residual volatile content increases, and color tone of the methacrylic resin and external appearance of a molded article are negatively affected.

The method by which the final conversion rates of the methacrylic acid ester monomer and the N-substituted maleimide monomer are controlled to within any of the ranges set forth above may be, but is not specifically limited to, a method in which the N-substituted maleimide monomer and a portion of the methacrylic acid ester monomer are first copolymerized, and then a remaining portion of the methacrylic acid ester monomer is added at a stage at which the conversion rate of the methacrylic acid ester monomer has reached 80% to 95%. All of the N-substituted maleimide monomer may be used or a portion of the N-substituted maleimide monomer may be used.

In such a case, the initial copolymerization of the N-substituted maleimide monomer and a portion of the methacrylic acid ester monomer may be performed by a batch process in which the N-substituted maleimide monomer and the portion of the methacrylic acid ester monomer are initially completely charged to a reactor, and then a radical initiator is added to perform polymerization, or by a semi-batch process in which polymerization is performed while feeding the monomers into the reactor. In both of these processes, it is preferable that after feeding of the monomers is complete, a period is provided to allow the conversion rate of the methacrylic acid ester monomer to reach the desired value.

Supplemental addition of a remaining portion of the methacrylic acid ester monomer is performed at a point at which the conversion rate of the methacrylic acid ester monomer has reached 80% to 95%.

The amount of monomer that is supplementally added at this stage when the total amount of monomer is taken to be 100 mass % is preferably 5 mass % to 35 mass %, more preferably 10 mass % to 30 mass %, and even more preferably 15 mass % to 25 mass %.

Supplemental addition of monomer in a proportion of 5 mass % or more is preferable for reducing the ratio of the N-substituted maleimide monomer in unreacted monomers and inhibiting production of oligomers having coloring ability, whereas supplemental addition of monomer in a proportion of 35 mass % or less is preferable for obtaining a molded article having high transmittance.

Note that in the supplemental addition, a portion of the N-substituted maleimide monomer or a vinyl monomer other than the methacrylic acid ester monomer and the N-substituted maleimide (i.e., a monomer that forms the previously described (C) monomer units) may also be added.

However, it is preferable that the N-substituted maleimide monomer is not substantially added at this stage from a viewpoint of raising the conversion rate of the N-substituted maleimide monomer at the end point of polymerization. In other words, it is preferable that a portion of the methacrylic acid ester monomer and all of the N-substituted maleimide monomer have been used prior to the supplemental addition.

In a case in which the N-substituted maleimide monomer is added at the stage of supplemental addition, the amount of the N-substituted maleimide monomer that is added when the total used amount of the N-substituted maleimide monomer is taken to be 100 mass % is preferably 10 mass % or less, more preferably 5 mass % or less, and particularly preferably 0 mass % from a viewpoint of raising the conversion rate of the N-substituted maleimide monomer.

The time taken to perform the supplemental addition is preferably set such that the rate of supplemental addition is close to the rate at which monomer is consumed in the polymerization reaction from a viewpoint of obtaining a molded article having high transmittance, and is preferably 30 minutes to 3 hours.

No specific limitations are placed on the polymerization solvent that is used so long as the solubility of a maleimide copolymer obtained through polymerization is high and an appropriate reaction liquid viscosity can be maintained for reasons such as prevention of gelation.

Specific examples of the polymerization solvent include aromatic hydrocarbons such as toluene, xylene, ethylbenzene, and isopropylbenzene; ketones such as methyl isobutyl ketone, butyl cellosolve, methyl ethyl ketone, and cyclohexanone; and polar solvents such as dimethylformamide and 2-methylpyrrolidone.

Moreover, an alcohol such as methanol, ethanol, or isopropanol may additionally be used as the polymerization solvent to the extent that dissolution of polymerized product in polymerization is not impaired.

Although the amount of solvent that is used in polymerization is not specifically limited so long as polymerization can proceed without precipitation or the like of copolymer or used monomer in production and the solvent can easily be removed, when the total amount of used monomer is taken to be 100 parts by mass, the amount of solvent is preferably 10 parts by mass to 200 parts by mass, more preferably 25 parts by mass to 200 parts by mass, even more preferably 50 parts by mass to 200 parts by mass, and further preferably 50 parts by mass to 150 parts by mass.

Although no specific limitations are placed on the polymerization temperature other than being a temperature at which polymerization proceeds, the polymerization temperature is preferably 70° C. to 180° C., more preferably 80° C. to 160° C., even more preferably 90° C. to 150° C., and further preferably 100° C. to 150° C. A polymerization temperature of 70° C. or higher is preferable from a viewpoint of productivity, whereas a polymerization temperature of 180° C. or lower is preferable for inhibiting side reactions in polymerization and obtaining a polymer of desired molecular weight and quality.

Moreover, although no specific limitations are placed on the polymerization time other than being a time that enables the required degree of polymerization to be obtained at the required conversion rate, the polymerization time is preferably 2 hours to 15 hours, more preferably 3 hours to 12 hours, and even more preferably 4 hours to 10 hours from a viewpoint of productivity and the like.

The polymerization conversion rate at the end point of polymerization of the methacrylic resin according to the present embodiment is preferably 90% to 98%, more preferably 91% to 97%, and even more preferably 92% to 96%.

The polymerization conversion rate is determined by subtracting the total mass of monomers remaining at the end point of polymerization from the total mass of monomers added to the polymerization system and then expressing the resultant value as a proportion relative to the total mass of monomers added to the polymerization system.

In the polymerization reaction, polymerization may be performed with addition of a chain transfer agent as necessary.

The chain transfer agent may be a chain transfer agent that is commonly used in radical polymerization and examples thereof include mercaptan compounds such as n-butyl mercaptan, n-octyl mercaptan, n-decyl mercaptan, n-dodecyl mercaptan, and 2-ethylhexyl thioglycolate; halogen compounds such as carbon tetrachloride, methylene chloride, and bromoform; and unsaturated hydrocarbon compounds such as α-methylstyrene dimer, α-terpinene, dipentene, and terpinolene.

One of these chain transfer agents may be used individually, or two or more of these chain transfer agents may be used together.

These chain transfer agents may be added at any stage, without any specific limitations, so long as the polymerization reaction is in progress.

The additive amount of the chain transfer agent when the total amount of monomer used in polymerization is taken to be 100 parts by mass may be 0.01 parts by mass to 1 part by mass, and is preferably 0.05 parts by mass to 0.5 parts by mass.

In solution polymerization, it is important to reduce the concentration of dissolved oxygen in the polymerization solution as much as possible in advance. For example, the concentration of dissolved oxygen is preferably 10 ppm or less.

The concentration of dissolved oxygen can be measured, for example, using a dissolved oxygen (DO) meter B-505 (produced by Iijima Electronics Corporation). The method by which the concentration of dissolved oxygen is reduced may be selected as appropriate from methods such as a method in which an inert gas is bubbled into the polymerization solution; a method in which an operation of pressurizing the inside of a vessel containing the polymerization solution to approximately 0.2 MPa with an inert gas and then releasing the pressure is repeated prior to polymerization; and a method in which an inert gas is passed through a vessel containing the polymerization solution.

A polymerization initiator is added in the polymerization reaction.

The polymerization initiator may be any initiator that is commonly used in radical polymerization and examples thereof include organic peroxides such as cumene hydroperoxide, diisopropylbenzene hydroperoxide, di-t-butyl peroxide, lauroyl peroxide, benzoyl peroxide, t-butylperoxy isopropyl carbonate, t-amyl peroxy-2-ethylhexanoate, t-amyl peroxyisononanoate, and 1,1-di(t-butylperoxy)cyclohexane; and azo compounds such as 2,2'-azobis(isobutyronitrile), 1,1'-azobis(cyclohexanecarbonitrile), 2,2'-azobis(2,4-dimethylvaleronitrile), and dimethyl-2,2'-azobisisobutyrate.

One of these polymerization initiators may be used individually, or two or more of these polymerization initiators may be used together.

These polymerization initiators may be added at any stage so long as the polymerization reaction is in progress.

The additive amount of the polymerization initiator when the total amount of monomer used in polymerization is taken to be 100 parts by mass may be 0.01 parts by mass to 1 part by mass, and is preferably 0.05 parts by mass to 0.5 parts by mass.

No specific limitations are placed on the method by which a polymerized product is collected from the polymerization solution obtained through solution polymerization. Examples of methods that can be adopted include a method in which the polymerization solution is added into an excess of a poor solvent in which the polymerized product obtained through polymerization does not dissolve, such as a hydrocarbon solvent or an alcohol solvent, treatment (emulsifying dispersion) is subsequently performed using a homogenizer, and unreacted monomers are separated from the polymerization solution by pre-treatment such as liquid-liquid extraction or solid-liquid extraction; and a method in which the polymerization solvent and unreacted monomers are separated by a step referred to as a devolatilization step to collect the polymerized product. Of these methods, a devolatilization step is preferable from a viewpoint of productivity.

The devolatilization step is a step in which volatile content such as the polymerization solvent, residual monomers, and reaction by-products are removed under heated vacuum conditions.

Examples of devices that may be used in the devolatilization step include devolatilization devices comprising a tubular heat exchanger and a devolatilization tank; thin film evaporators such as WIPRENE and EXEVA produced by Kobelco Eco-Solutions Co., Ltd., and Kontro and Diagonal-Blade Kontro produced by Hitachi, Ltd.; and vented extruders having sufficient residence time and surface area for displaying devolatilization capability.

Moreover, it is possible to adopt a devolatilization step or the like in which a devolatilization device that is a combination of two or more of these devices is used.

The treatment temperature in the devolatilization device is preferably 150° C. to 350° C., more preferably 170° C. to 300° C., and even more preferably 200° C. to 280° C. A temperature that is at least any of the lower limits set forth above can restrict residual volatile content, whereas a temperature that is not higher than any of the upper limits set forth above can inhibit coloring and decomposition of the obtained acrylic resin.

The degree of vacuum in the devolatilization device may be within a range of 10 Torr to 500 Torr, and preferably within a range of 10 Torr to 300 Torr. A degree of vacuum that is not more than any of the upper limits set forth above can restrict the residual amount of volatile content, whereas a degree of vacuum that is at least the lower limit set forth above is realistic in terms of industrial implementation.

The treatment time is selected as appropriate depending on the amount of residual volatile content and is preferably as short as possible in order to inhibit coloring or decomposition of the obtained acrylic resin.

The polymerized product collected through the devolatilization step is pelletized through a step referred to as a pelletization step.

In the pelletization step, molten resin is extruded from a porous die as strands and is then pelletized by cold cutting, hot cutting in air, strand cutting in water, or underwater cutting.

In a situation in which a vented extruder is used as a devolatilization device, the devolatilization step and the pelletization step may be combined.

(Methacrylic Resin Composition)

A methacrylic resin composition according to the present embodiment contains the methacrylic resin according to the present embodiment set forth above and may optionally further contain additives, resins other than the methacrylic resin, rubbery polymers, and so forth.

—Additives—

The methacrylic resin composition according to the present embodiment may contain various additives to the extent that the effects disclosed herein are not significantly lost.

Examples of additives that may be used include, but are not specifically limited to, antioxidants, light stabilizers such as hindered amine light stabilizers, ultraviolet absorbers, release agents, other thermoplastic resins, paraffinic process oils, naphthenic process oils, aromatic process oils, paraffin, organic polysiloxanes, mineral oils, and other softeners and plasticizers, flame retardants, antistatic agents, organic fibers, inorganic fillers such as pigments (for example, iron oxide), reinforcers such as glass fiber, carbon fiber, and metal whisker, colorants, organophosphorus compounds such as phosphorus acid esters, phosphonites, and phosphoric acid esters, other additives, and mixtures of any of the preceding examples.

—Antioxidant—

It is preferable that an antioxidant is added to the methacrylic resin according to the present embodiment to inhibit degradation and coloring during molding processing or use.

Examples of antioxidants that may be used include, but are not limited to, hindered phenol antioxidants, phosphoric antioxidants, and sulfuric antioxidants. The methacrylic resin according to the present embodiment is suitable for use in various applications such as melt-extrusion, injection molding, and film shaping applications. The heat history imparted in processing depends on the processing method and may take various forms such as tens of seconds in the case of an extruder to tens of minutes to several hours in the case of molding processing of a thick product or shaping of a sheet.

In a case in which a long heat history is imparted, it is necessary to increase the additive amount of thermal stabilizer in order to obtain the desired thermal stability. From a viewpoint of inhibiting thermal stabilizer bleed-out and preventing adhesion of a film to a roll in film production, it is preferable to use a plurality of thermal stabilizers together. For example, it is preferable to use a hindered phenol antioxidant together with at least one selected from a phosphoric antioxidant and a sulfuric antioxidant.

One of these antioxidants may be used, or two or more of these antioxidants may be used together.

Examples of hindered phenol antioxidants that may be used include, but are not limited to, pentaerythritol tetrakis[3-(3,5-di-tert-butyl-4-hydroxyphenyl)propionate], thiodiethylene bis[3-(3,5-di-tert-butyl-4-hydroxyphenyl)propionate], octadecyl-3-(3,5-di-tert-butyl-4-hydroxyphenyl)propionate, 3,3',3",5,5',5"-hexa-tert-butyl-a,a',a"-(mesitylene-2,4,6-triyl)tri-p-cresol, 4,6-bis(octylthiomethyl)-o-cresol, 4,6-bis(dodecylthiomethyl)-o-cresol, ethylenebis(oxyethylene) bis[3-(5-tert-butyl-4-hydroxy-m-tolyl)propionate], hexamethylene bis[3-(3,5-di-tert-butyl-4-hydroxyphenyl)propionate], 1,3,5-tris(3,5-di-tert-butyl-4-hydroxybenzyl)-1,3,5-triazine-2,4,6(1H,3H,5H)-trione, 1,3,5-tris[(4-tert-butyl-3-hydroxy-2,6-xylene)methyl]-1,3,5-triazine-2,4,6(1H, 3H,5H)-trione, 2,6-di-tert-butyl-4-(4,6-bis(octylthio)-1,3,5-triazin-2-ylamine)phenol, 2-[1-(2-hydroxy-3,5-di-tert-pentylphenyl)ethyl]-4,6-di-tert-pentylphenyl acrylate, and 2-tert-butyl-4-methyl-6-(2-hydroxy-3-tert-butyl-5-methylbenzyl)phenyl acrylate.

In particular, pentaerythritol tetrakis[3-(3,5-di-tert-butyl-4-hydroxyphenyl)propionate], octadecyl-3-(3,5-di-t-butyl- 4-hydroxyphenyl)propionate, and 2-[1-(2-hydroxy-3,5-di-tert-pentylphenyl)ethyl]-4,6-di-tert-pentylphenyl acrylate are preferable.

A commercially available phenolic antioxidant may be used as a hindered phenol antioxidant serving as the antioxidant. Examples of such commercially available phenolic antioxidants include, but are not limited to, Irganox 1010 (pentaerythritol tetrakis[3-(3,5-di-t-butyl-4-hydroxyphenyl)propionate]; produced by BASF), Irganox 1076 (octadecyl-3-(3,5-di-t-butyl-4-hydroxyphenyl)propionate; produced by BASF), Irganox 1330 (3,3',3'',5,5',5''-hexa-t-butyl-a,a',a''-(mesitylene-2,4,6-triyl)tri-p-cresol; produced by BASF), Irganox 3114 (1,3,5-tris(3,5-di-t-butyl-4-hydroxybenzyl)-1,3,5-triazine-2,4,6(1H,3H,5H)-trione; produced by BASF), Irganox 3125 (produced by BASF), ADK STAB AO-60 (pentaerythritol tetrakis[3-(3,5-di-t-butyl-4-hydroxyphenyl)propionate]; produced by Adeka Corporation), ADK STAB AO-80 (3,9-bis {2-[3-(3-t-butyl-4-hydroxy-5-methylphenyl)propionyloxy]-1,1-dimethylethyl}-2,4,8,10-tetraoxaspiro[5.5]undecane; produced by Adeka Corporation), Sumilizer BHT (produced by Sumitomo Chemical Co., Ltd.), Cyanox 1790 (produced by Cytec Solvay Group), Sumilizer GA-80 (produced by Sumitomo Chemical Co., Ltd.), Sumilizer GS (2-[1-(2-hydroxy-3,5-di-tert-pentylphenyl)ethyl]-4,6-di-tert-pentylphenyl acrylate; produced by Sumitomo Chemical Co., Ltd.), Sumilizer GM (2-tert-butyl-4-methyl-6-(2-hydroxy-3-tert-butyl-5-methylbenzyl)phenyl acrylate; produced by Sumitomo Chemical Co., Ltd.), and vitamin E (produced by Eisai Co., Ltd.).

Of these commercially available phenolic antioxidants, Irganox 1010, ADK STAB AO-60, ADK STAB AO-80, Irganox 1076, Sumilizer GS, and the like are preferable in terms of thermal stability imparting effect with respect to resin.

One of these phenolic antioxidants may be used individually, or two or more of these phenolic antioxidants may be used together.

Examples of phosphoric antioxidants that may be used as the antioxidant include, but are not limited to, tris(2,4-di-t-butylphenyl) phosphite, phosphorus acid bis(2,4-bis(1,1-dimethylethyl)-6-methylphenyl)ethyl ester, tetrakis(2,4-di-t-butylphenyl)(1,1-biphenyl)-4,4'-diyl bisphosphonite, bis(2,4-di-t-butylphenyl)pentaerythritol diphosphite, bis(2,6-di-t-butyl-4-methylphenyl)pentaerythritol diphosphite, bis(2,4-dicumylphenyl)pentaerythritol diphosphite, tetrakis(2,4-t-butylphenyl)(1,1-biphenyl)-4,4'-diyl bisphosphonite, di-t-butyl-m-cresyl phosphonite, 4-[3-[(2,4,8,10-tetra-tert-butyldibenzo[d,f][1,3,2]dioxaphosphepin)-6-yloxy]propyl]-2-methyl-6-tert-butylphenol.

A commercially available phosphoric antioxidant may be used as the phosphoric antioxidant. Examples of commercially available phosphoric antioxidants that may be used include, but are not limited to, Irgafos 168 (tris(2,4-di-t-butylphenyl) phosphite; produced by BASF), Irgafos 12 (tris[2-[[2,4,8,10-tetra-t-butyldibenzo[d,f][1,3,2]dioxaphosphepin-6-yl]oxy]ethyl]amine; produced by BASF), Irgafos 38 (phosphorus acid bis(2,4-bis(1,1-dimethylethyl)-6-methylphenyl)ethyl ester; produced by BASF), ADK STAB 329K (produced by Adeka Corporation), ADK STAB PEP-36 (produced by Adeka Corporation), ADK STAB PEP-36A (produced by Adeka Corporation), ADK STAB PEP-8 (produced by Adeka Corporation), ADK STAB HP-10 (produced by Adeka Corporation), ADK STAB 2112 (produced by Adeka Corporation), ADK STAB 1178 (produced by Adeka Corporation), ADK STAB 1500 (produced by Adeka Corporation), Sandstab P-EPQ (produced by Clariant), Weston 618 (produced by GE), Weston 619G (produced by GE), Ultranox 626 (produced by GE), Sumilizer GP (4-[3-[(2,4,8,10-tetra-tert-butyldibenzo[d,f][1,3,2]dioxaphosphepin)-6-yloxy]propyl]-2-methyl-6-tert-butylphenol; produced by Sumitomo Chemical Co., Ltd.), and HCA (9,10-dihydro-9-oxa-10-phosphaphenanthrene-10-oxide; produced by Sanko Co., Ltd.).

Of these commercially available phosphoric antioxidants, Irgafos 168, ADK STAB PEP-36, ADK STAB PEP-36A, ADK STAB HP-10, and ADK STAB 1178 are preferable, and ADK STAB PEP-36A and ADK STAB PEP-36 are particularly preferable from a viewpoint of thermal stability imparting effect with respect to resin and combined effect with various antioxidants.

One of these phosphoric antioxidants may be used individually, or two or more of these phosphoric antioxidants may be used together.

Examples of sulfuric antioxidants that may be used as the antioxidant include, but are not limited to, 2,4-bis(dodecylthiomethyl)-6-methylphenol (Irganox 1726 produced by BASF), Irganox 1520L (produced by BASF), 2,2-bis {[3-(dodecylthio)-1-oxopropoxy]methyl}propan-1,3-diyl bis[3-(dodecylthio)propionate] (ADK STAB AO-412S produced by Adeka Corporation), 2,2-bis {[3-(dodecylthio)-1-oxopropoxy]methyl}propan-1,3-diyl bis[3-(dodecylthio)propionate] (KEMINOX PLS produced by Chemipro Kasei Kaisha, Ltd.), and di(tridecyl)-3,3'-thiodipropionate (AO-503 produced by Adeka Corporation).

Of these commercially available sulfuric antioxidants, ADK STAB AO-412S, and KEMINOX PLS are preferable from a viewpoint thermal stability imparting effect with respect to resin and combined effect with various antioxidants, and from a viewpoint of handleability.

One of these sulfuric antioxidants may be used individually, or two or more of these sulfuric antioxidants may be used together.

Although the content of the antioxidant may be any amount that enables an effect of thermal stability improvement, excessively high antioxidant content may lead to problems such as bleed-out during processing. Accordingly, the content of the antioxidant relative to 100 parts by mass of the methacrylic resin is preferably 5 parts by mass or less, more preferably 3 parts by mass or less, even more preferably 1 part by mass or less, further preferably 0.8 parts by mass or less, even further preferably 0.01 parts by mass to 0.8 parts by mass, and particularly preferably 0.01 parts by mass to 0.5 parts by mass.

Although no specific limitations are placed on the timing of addition of the antioxidant, a method in which the antioxidant is added to a monomer solution before polymerization and polymerization is subsequently initiated, a method in which the antioxidant is added to and mixed with a polymer solution obtained after polymerization, and is then subjected to a devolatilization step, a method in which the antioxidant is added to and mixed with molten polymer after devolatilization and then pelletization is performed, and a method in which the antioxidant is added to and mixed with devolatilized and pelletized pellets when these pellets are re-melted and extruded. Of these methods, it is preferable that the antioxidant is added to and mixed with a polymer solution obtained after polymerization before a devolatilization step is performed and that a devolatilization step is subsequently performed from a viewpoint of preventing thermal degradation and coloring in the devolatilization step.

—Hindered Amine Light Stabilizer—

A hindered amine light stabilizer may be added to the methacrylic resin according to the present embodiment.

The hindered amine light stabilizer is preferably a compound including three or more cyclic structures but is not specifically limited thereto. At least one cyclic structure selected from the group consisting of an aromatic ring, an aliphatic ring, an aromatic heterocycle, and a non-aromatic heterocycle is preferable. Moreover, in the case of a single compound including two or more cyclic structures, these cyclic structures may be the same or different.

Specific examples of hindered amine light stabilizers that may be used include, but are not limited to, bis(1,2,2,6,6-pentamethyl-4-piperidyl) [[3,5-bis(1,1-dimethylethyl)-4-hydroxyphenyl]methyl]butylmalonate, a mixture of bis(1,2,2,6,6-pentamethyl-4-piperidyl) sebacate and methyl 1,2,2,6,6-pentamethyl-4-piperidyl sebacate, bis(2,2,6,6-tetramethyl-4-piperidyl) sebacate, N,N'-bis(2,2,6,6-tetramethyl-4-piperidyl)-N,N'-diformylhexamethylenediamine, a polycondensate of dibutylamine/1,3,5-triazine/N,N'-bis(2,2,6,6-tetramethyl-4-piperidiyl)-1,6-hexamethylenediamine and N-(2,2,6,6-tetramethyl-4-piperidiyl)butylamine, poly[{6-(1,1,3,3-tetramethylbutyl)amino-1,3,5-triazin-2,4-diyl}{(2,2,6,6-tetramethyl-4-piperidyl)imino}hexamethylene {(2,2,6,6-tetramethyl-4-piperidyl)imino}], tetrakis(1,2,2,6,6-pentamethyl-4-piperidyl)butane-1,2,3,4-tetracarboxylate, tetrakis(2,2,6,6-tetramethyl-4-piperidyl)butane-1,2,3,4-tetracarboxylate, a reaction product of 1,2,2,6,6-pentamethyl-4-piperidinol and β,β,β',β'-tetramethyl-2,4,8,10-tetraoxaspiro[5.5]undecane-3,9-diethanol, a reaction product of 2,2,6,6-tetramethyl-4-piperidinol and β,β,β',β'-tetramethyl-2,4,8,10-tetraoxaspiro[5.5]undecane-3,9-diethanol, bis(1-undecanoxy-2,2,6,6-tetramethylpiperidin-4-yl)carbonate, 1,2,2,6,6-pentamethyl-4-piperidyl methacrylate, and 2,2,6,6-tetramethyl-4-piperidyl methacrylate.

Of these examples, bis(1,2,2,6,6-pentamethyl-4-piperidyl) [[3,5-bis(1,1-dimethylethyl)-4-hydroxyphenyl]methyl]butylmalonate, a polycondensate of dibutylamine/1,3,5-triazine/N,N'-bis(2,2,6,6-tetramethyl-4-piperidiyl)-1,6-hexamethylenediamine and N-(2,2,6,6-tetramethyl-4-piperidiyl)butylamine, poly[{6-(1,1,3,3-tetramethylbutyl)amino-1,3,5-triazin-2,4-diyl}{(2,2,6,6-tetramethyl-4-piperidyl)imino}hexamethylene {(2,2,6,6-tetramethyl-4-piperidyl)imino}], a reaction product of 1,2,2,6,6-pentamethyl-4-piperidinol and β,β,β',β'-tetramethyl-2,4,8,10-tetraoxaspiro[5.5]undecane-3,9-diethanol, and a reaction product of 2,2,6,6-tetramethyl-4-piperidinol and β,β,β',β'-tetramethyl-2,4,8,10-tetraoxaspiro[5.5]undecane-3,9-diethanol, which include three or more cyclic structures, are preferable.

Although the content of the hindered amine light stabilizer may be any amount that enables an effect of light stability improvement, excessively high hindered amine light stabilizer content may lead to problems such as bleed-out during processing. Accordingly, the content of the hindered amine light stabilizer relative to 100 parts by mass of the methacrylic resin is preferably 5 parts by mass or less, more preferably 3 parts by mass or less, even more preferably 1 part by mass or less, further preferably 0.8 parts by mass or less, even further preferably 0.01 parts by mass to 0.8 parts by mass, and particularly preferably 0.01 parts by mass to 0.5 parts by mass.

—Ultraviolet Absorber—

An ultraviolet absorber may be added to the methacrylic resin according to the present embodiment.

Although no specific limitations are placed on ultraviolet absorbers that may be used, an ultraviolet absorber having a maximum absorption wavelength in a range of 280 nm to 380 nm is preferable. Examples of ultraviolet absorbers that may be used include benzotriazole compounds, benzotriazine compounds, benzophenone compounds, oxybenzophenone compounds, benzoate compounds, phenolic compounds, oxazole compounds, cyanoacrylate compounds, and benzoxazinone compounds.

Examples of benzotriazole compounds include 2,2'-methylenebis[4-(1,1,3,3-tetramethylbutyl)-6-(2H-benzotriazol-2-yl)phenol], 2-(3,5-di-tert-butyl-2-hydroxyphenyl)-5-chlorobenzotriazole, 2-(2H-benzotriazol-2-yl)-p-cresol, 2-(2H-benzotriazol-2-yl)-4,6-bis(1-methyl-1-phenylethyl)phenol, 2-benzotriazol-2-yl-4,6-di-tert-butylphenol, 2-[5-chloro(2H)-benzotriazol-2-yl]-4-methyl-6-t-butylphenol, 2-(2H-benzotriazol-2-yl)-4,6-di-t-butylphenol, 2-(2H-benzotriazol-2-yl)-4-(1,1,3,3-tetramethylbutyl)phenol, 2-(2H-benzotriazol-2-yl)-4-methyl-6-(3,4,5,6-tetrahydrophthalimidylmethyl)phenol, methyl 3-(3-(2H-benzotriazol-2-yl)-5-t-butyl-4-hydroxyphenyl)propionate/ polyethylene glycol 300 reaction product, 2-(2H-benzotriazol-2-yl)-6-(linear/branched dodecyl)-4-methylphenol, 2-(5-methyl-2-hydroxyphenyl)benzotriazole, 2-[2-hydroxy-3,5-bis(α,α-dimethylbenzyl)phenyl]-2H-benzotriazole, and 3-(2H-benzotriazol-2-yl)-5-(1,1-dimethylethyl)-4-hydroxy-C7-9 branched/linear alkyl esters.

Of these benzotriazole compounds, benzotriazole compounds having a molecular weight of 400 or more are preferable. Examples of such benzotriazole compounds that are commercially available products include Kemisorb® 2792 (Kemisorb is a registered trademark in Japan, other countries, or both; produced by Chemipro Kasei Kaisha, Ltd.), ADK STAB® LA31 (ADK STAB is a registered trademark in Japan, other countries, or both; produced by Adeka Corporation), and TINUVIN® 234 (TINUVIN is a registered trademark in Japan, other countries, or both; produced by BASF).

Examples of benzotriazine compounds include 2-mono(hydroxyphenyl)-1,3,5-triazine compounds, 2,4-bis(hydroxyphenyl)-1,3,5-triazine compounds, and 2,4,6-tris(hydroxyphenyl)-1,3,5-triazine compounds. Specific examples include 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-(2-hydroxy-4-propoxyphenyl)-1,3,5-triazine, 2,4-diphenyl-(2-hydroxy-4-butoxyphenyl)-1,3,5-triazine, 2,4-diphenyl-6-(2-hydroxy-4-butoxyphenyl)-1,3,5-triazine, 2,4-diphenyl-6-(2-hydroxy-4-hexyloxyphenyl)-1,3,5-triazine, 2,4-diphenyl-6-(2-hydroxy-4-octyloxyphenyl)-1,3,5-triazine, 2,4-diphenyl-6-(2-hydroxy-4-dodecyloxyphenyl)-1,3,5-triazine, 2,4-diphenyl-6-(2-hydroxy-4-benzyloxyphenyl)-1,3,5-triazine, 2,4-diphenyl-6-(2-hydroxy-4-butoxyethoxy)-1,3,5-triazine, 2,4-bis(2-hydroxy-4-butoxyphenyl)-6-(2,4-dibutoxyphenyl)-1,3,5-triazine, 2,4,6-tris(2-hydroxy-4-methoxyphenyl)-1,3,5-triazine, 2,4,6-tris(2-hydroxy-4-ethoxyphenyl)-1,3,5-triazine, 2,4,6-tris(2-hydroxy-4-propoxyphenyl)-1,3,5-triazine, 2,4,6-tris(2-hydroxy-4-butoxyphenyl)-1,3,5-triazine, 2,4,6-tris(2-hydroxy-4-hexyloxyphenyl)-1,3,5-triazine, 2,4,6-tris(2-hydroxy-4-octyloxyphenyl)-1,3,5-triazine, 2,4,6-tris(2-hydroxy-4-dodecyloxyphenyl)-1,3,5-triazine, 2,4,6-tris(2-hydroxy-4-benzyloxyphenyl)-1,3,5-triazine, 2,4,6-tris(2-hydroxy-4-ethoxyethoxyphenyl)-1,3,5-triazine, 2,4,6-tris(2-hydroxy-4-butoxyethoxyphenyl)-1,3,5-triazine, 2,4,6-tris(2-hydroxy-4-propoxyethoxyphenyl)-1,3,5-triazine, 2,4,6-tris(2-hydroxy-4-methoxycarbonylpropyloxyphenyl)-1,3,5-triazine, 2,4,6-tris (2-hydroxy-4-ethoxycarbonylethyl oxyphenyl)-1,3,5-triazine, 2,4,6-tris(2-hydroxy-4-(1-(2-ethoxyhexyloxy)-1-oxopropan-2-yloxy)phenyl)-1,3,5-triazine, 2,4,6-tris(2-hydroxy-3-methyl-4-methoxyphenyl)-1,3,5-triazine, 2,4,6-tris(2-hydroxy-3-methyl-4-ethoxyphenyl)-1,3,5-triazine, 2,4,6-tris(2-hydroxy-3-methyl-4-propoxyphenyl)-1,3,5-triazine, 2,4,6-tris(2-hydroxy-3-methyl-4-butoxyphenyl)-1,3,5-triazine, 2,4,6-tris(2-hydroxy-3-methyl-4-hexyloxyphenyl)-1,3,5-triazine, 2,4,6-tris(2-hydroxy-3-methyl-4-octyloxyphenyl)-1,3,5-triazine, 2,4,6-tris(2-hydroxy-3-methyl-4-dodecyloxyphenyl)-1,3,5-triazine, 2,4,6-tris(2-hydroxy-3-methyl-4-benzyloxyphenyl)-1,3,5-triazine, 2,4,6-tris(2-hydroxy-3-methyl-4-ethoxyethoxyphenyl)-1,3,5-triazine, 2,4,6-tris(2-hydroxy-3-methyl-4-butoxyethoxyphenyl)-1,3,5-triazine, 2,4,6-tris(2-hydroxy-3-methyl-4-propoxyethoxyphenyl)-1,3,5-triazine, 2,4,6-tris(2-hydroxy-3-methyl-4-methoxycarbonylpropyloxyphenyl)-1,3,5-triazine, 2,4,6-tris(2-hydroxy-3-methyl-4-ethoxycarbonylethyl oxyphenyl)-1,3,5-triazine, and 2,4,6-tris(2-hydroxy-3-methyl-4-(1-(2-ethoxyhexyloxy)-1-oxopropan-2-yloxy)phenyl)-1,3,5-triazine.

Commercially available products such as Kemisorb 102 (produced by Chemipro Kasei Kaisha, Ltd.), LA-F70 (produced by Adeka Corporation), LA-46 (produced by Adeka Corporation), TINUVIN 405 (produced by BASF), TINUVIN 460 (produced by BASF), TINUVIN 479 (produced by BASF), and TINUVIN 1577FF (produced by BASF) may be used as these benzotriazine compounds.

Of these benzotriazine compounds, an ultraviolet absorber having a 2,4-bis(2,4-dimethylphenyl)-6-[2-hydroxy-4-(3-alkyloxy-2-hydroxypropyloxy)-5-α-cumylphenyl]-s-triazine framework ("alkyloxy" refers to a long chain alkyloxy group such as an octyloxy, nonyloxy, or decyloxy group) is more preferable in terms of having high acrylic resin compatibility and excellent ultraviolet absorption properties.

Particularly from a viewpoint of resin compatibility and volatility during heating, the ultraviolet absorber is preferably a benzotriazine compound or a benzotriazole compound having a molecular weight of 400 or more, and from a viewpoint of inhibiting decomposition of the ultraviolet absorber under heating during extrusion processing, the ultraviolet absorber is particularly preferably a benzotriazine compound.

The melting point (Tm) of the ultraviolet absorber is preferably 80° C. or higher, more preferably 100° C. or higher, even more preferably 130° C. or higher, and further preferably 160° C. or higher.

The weight reduction rate of the ultraviolet absorber under heating from 23° C. to 260° C. at a rate of 20° C./min is preferably 50% or less, more preferably 30% or less, even more preferably 15% or less, further preferably 10% or less, and even further preferably 5% or less.

One of these ultraviolet absorbers may be used individually, or two or more of these ultraviolet absorbers may be used together. The combined use of two ultraviolet absorbers having different structures enables ultraviolet absorption over a wide wavelength region.

Although the amount of the ultraviolet absorber that is used is not specifically limited so long as the effects disclosed herein can be displayed without impairing heat resistance, damp heat resistance, thermal stability, and molding processability, the amount relative to 100 parts by mass of the methacrylic resin is preferably 0.1 parts by mass to 5 parts by mass, more preferably 0.2 parts by mass to 4 parts by mass, even more preferably 0.25 parts by mass to 3 parts by mass, and further preferably 0.3 parts by mass to 3 parts by mass. When the amount of the ultraviolet absorber is within any of the ranges set forth above, an excellent balance of ultraviolet absorption performance, molding properties, and so forth can be obtained.

—Release Agent—

A release agent may be added to the methacrylic resin according to the present embodiment. Examples of release agents that may be used include, but are not limited to, fatty acid esters, fatty acid amides, fatty acid metal salts, hydrocarbon lubricants, alcohol lubricants, polyalkylene glycols, carboxylic acid esters, and hydrocarbon paraffinic mineral oils.

Fatty acid esters that may be used as the release agent include conventional and commonly known fatty acid esters but are not specifically limited thereto.

Examples of fatty acid esters include ester compounds of a fatty acid having a carbon number of 12 to 32, such as lauric acid, palmitic acid, heptadecanoic acid, stearic acid, oleic acid, arachidic acid, or behenic acid, and a monohydric aliphatic alcohol, such as palmityl alcohol, stearyl alcohol, or behenyl alcohol, or a polyhydric aliphatic alcohol, such as glycerin, pentaerythritol, dipentaerythritol, or sorbitan; and composite ester compounds of a fatty acid, a polybasic organic acid, and a monohydric aliphatic alcohol or a polyhydric aliphatic alcohol.

Examples of fatty acid ester lubricants such as described above include cetyl palmitate, butyl stearate, stearyl stearate, stearyl citrate, glycerin monocaprylate, glycerin monocaprate, glycerin monolaurate, glycerin monopalmitate, glycerin dipalmitate, glycerin monostearate, glycerin distearate, glycerin tristearate, glycerin monooleate, glycerin dioleate, glycerin trioleate, glycerin monolinoleate, glycerin monobehenate, glycerin mono-12-hydroxystearate, glycerin di-12-hydroxystearate, glycerin tri-12-hydroxystearate, glycerin diacetomonostearate, glycerin citric acid fatty acid ester, pentaerythritol adipate stearate, montanic acid partially saponified ester, pentaerythritol tetrastearate, dipentaerythritol hexastearate, and sorbitan tristearate.

One of these fatty acid ester lubricants may be used individually, or two or more of these fatty acid ester lubricants may be used in combination.

Examples of commercially available products that may be used include the RIKEMAL series, the POEM series, the RIKESTER series, and the RIKEMASTER series produced by Riken Vitamin Co., Ltd., and the EXCEL series, the RHEODOL series, the EXCEPARL series, and the COCONAD series produced by Kao Corporation. More specific examples include RIKEMAL S-100, RIKEMAL H-100, POEM V-100, RIKEMAL B-100, RIKEMAL HC-100, RIKEMAL S-200, POEM B-200, RIKESTER EW-200, RIKESTER EW-400, EXCEL S-95, and RHEODOL MS-50.

Fatty acid amide lubricants that may be used include conventional and commonly known fatty acid amide lubricants but are not specifically limited thereto.

Examples of fatty acid amide lubricants include saturated fatty acid amides such as lauramide, palmitamide, stearamide, behenamide, and hydroxystearamide; unsaturated fatty acid amides such as oleamide, erucamide, and ricinoleamide; substituted amides such as N-stearyl stearamide, N-oleyl oleamide, N-stearyl oleamide, N-oleyl stearamide, N-stearyl erucamide, and N-oleyl palmitamide; methylol amides such as methylol stearamide and methylol behenamide; saturated fatty acid bisamides such as methylene bisstearamide, ethylene biscapramide, ethylene bislauramide, ethylene bisstearamide (ethylene bis(stearyl amide)), ethylene bisisostearamide, ethylene bishydroxystearamide, ethylene bisbehenamide, hexamethylene bisstearamide, hexamethylene bisbehenamide, hexamethylene bishydroxystearamide, N,N'-distearyl adipamide, and N,N'-distearyl sebacamide; unsaturated fatty acid bisamides such as ethylene bisoleamide, hexamethylene bisoleamide, N,N'-dioleyl adipamide, and N,N'-dioleyl sebacamide; and aromatic bisamides such as m-xylylene bisstearamide and N,N'-distearyl isophthalamide.

One of these fatty acid amide release agents may be used individually, or two or more of these fatty acid amide release agents may be used in combination.

Examples of commercially available products that may be used include the DIAMID series (produced by Nippon Kasei Chemical Co., Ltd.), the AMIDE series (produced by Nippon Kasei Chemical Co., Ltd.), the NIKKA AMIDE series (produced by Nippon Kasei Chemical Co., Ltd.), the METHYLOL AMIDE series (produced by Nippon Kasei Chemical Co., Ltd.), the BISAMIDE series (produced by Nippon Kasei Chemical Co., Ltd.), the SLIPACKS series (produced by Nippon Kasei Chemical Co., Ltd.), the KAO WAX series (produced by Kao Corporation), the FATTY AMIDE series (produced by Kao Corporation), and ethylene bisstearamides (produced by Dainichi Chemical Industry Co., Ltd.).

The term "fatty acid metal salt" refers to a metal salt of a higher fatty acid and examples thereof include lithium stearate, magnesium stearate, calcium stearate, calcium laurate, calcium ricinoleate, strontium stearate, barium stearate, barium laurate, barium ricinoleate, zinc stearate, zinc laurate, zinc ricinoleate, zinc 2-ethylhexanoate, lead stearate, dibasic lead stearate, lead naphthenate, calcium 12-hydroxystearate, and lithium 12-hydroxystearate. Of these fatty acid metal salts, calcium stearate, magnesium stearate, and zinc stearate are particularly preferable because the resultant transparent resin composition has excellent processability and exceptional transparency.

Examples of commercially available products that may be used include the SZ series, the SC series, the SM series, and the SA series produced by Sakai Chemical Industry Co., Ltd.

In a case in which a fatty acid metal salt is used, the amount thereof relative to 100 mass % of the methacrylic resin composition is preferably 0.2 mass % or less from a viewpoint of transparency retention.

One release agent may be used individually, or two or more release agents may be used together.

The release agent that is used preferably has a decomposition onset temperature of 200° C. or higher. The decomposition onset temperature can be measured through the 1% mass reduction temperature by TGA.

Although the content of the release agent may be any amount that enables an effect as a release agent, excessively high release agent content may lead to problems such as bleed-out during processing or poor extrusion due to screw slipping. Accordingly, the content of the release agent relative to 100 parts by mass of the methacrylic resin is preferably 5 parts by mass or less, more preferably 3 parts by mass or less, even more preferably 1 part by mass or less, further preferably 0.8 parts by mass or less, even further preferably 0.01 parts by mass to 0.8 parts by mass, and particularly preferably 0.01 parts by mass to 0.5 parts by mass. Addition of the release agent in an amount that is within any of the ranges set forth above is preferable because this tends to inhibit poor release in injection molding and adhesion to a metal roll in sheet shaping while also suppressing reduction in transparency caused by addition of the release agent.

—Other Thermoplastic Resins—

Another thermoplastic resin may be compounded with the methacrylic resin according to the present embodiment with the aim of adjusting birefringence or improving flexibility so long as the objectives of this disclosure are not impeded.

Examples of other thermoplastic resins that may be used include polyacrylates such as polybutyl acrylate; styrene polymers such as polystyrene, styrene-methyl methacrylate copolymer, styrene-butyl acrylate copolymer, styrene-acrylonitrile copolymer, and acrylonitrile-butadiene-styrene block copolymer; acrylic rubber particles having a 3 or 4 layer structure described in JP S59-202213 A, JP S63-27516 A, JP S51-129449 A, JP S52-56150 A, and so forth; rubbery polymers disclosed in JP S60-17406 B and JP H8-245854 A; and methacrylic rubber-containing graft copolymer particles obtained by multi-step polymerization described in WO 2014-002491 A1.

Of these other thermoplastic resins, from a viewpoint of obtaining good optical properties and mechanical properties, it is preferable to use a styrene-acrylonitrile copolymer or rubber-containing graft copolymer particles having a grafted portion in a surface layer thereof with a chemical composition that is compatible with a methacrylic resin including a structural unit having a cyclic structure in the main chain thereof.

The average particle diameter of acrylic rubber particles, methacrylic rubber-containing graft copolymer particles, or a rubbery polymer such as described above is preferably 0.03 μm to 1 μm, and more preferably 0.05 μm to 0.5 μm from a viewpoint of improving impact strength, optical properties, and so forth of a film obtained using the composition according to the present embodiment.

The content of other thermoplastic resins relative to 100 parts by mass of the methacrylic resin is preferably 0 parts by mass to 50 parts by mass, and more preferably 0 parts by mass to 25 parts by mass.

Properties of the methacrylic resin composition according to the present embodiment (specifically the composition of structural units, glass transition temperature (Tg), content of components that exhibit light absorption at a wavelength of 400 nm and content of components having a molecular weight of 2,000 or less in methanol-soluble content, proportion of methanol-soluble content, molecular weight, and photoelastic coefficient ($C_R$)) are as previously described in relation to the methacrylic resin according to the present embodiment.

(Methacrylic Resin Composition Production Method)

The method by which the methacrylic resin composition is produced may, for example, be a method of kneading using a kneading machine such as an extruder, a heating roller, a kneader, a roller mixer, or a Banbury mixer. Of these methods, kneading by an extruder is preferable in terms of productivity. The kneading temperature may be set in accordance with the preferred processing temperature of the polymer forming the methacrylic resin or another resin mixed therewith. As a rough guide, the kneading temperature may be within a range of 140° C. to 300° C., and is preferably within a range of 180° C. to 280° C. The extruder is preferably provided with a vent for reduction of volatile content.

(Molded Article)

The methacrylic resin and methacrylic resin composition according to the present embodiment can suitably be used as materials for various molded articles.

(Molded Article Production Method)

Various molding methods such as extrusion molding, injection molding, compression molding, calendering, inflation molding, and blow molding may be used as the production method of the molded article.

Examples of molded article applications include household goods, OA equipment, AV equipment, battery fittings, lighting equipment, automotive component applications, housing applications, sanitary applications as a sanitary ware alternative or the like, and optical component applications.

Examples of automotive components include tail lamps, meter covers, head lamps, light guide rods, lenses, and car navigation system front plates.

Examples of optical component applications include light guide plates, diffuser plates, polarizing plate protective films, quarter-wave plates, half-wave plates, viewing angle control films, liquid-crystal optical compensation films, other retardation films, display front plates, display substrates, lenses, touch panels, and the like used in displays such as liquid-crystal displays, plasma displays, organic EL displays, field emission displays, and rear projection televisions. Use in transparent substrates and the like of solar cells is also appropriate. Other possible applications include those in the fields of optical communication systems, optical switching systems, and optical measurement systems, or in optical products such as head mounted displays and liquid-crystal projectors for waveguides, lenses, optical fibers, optical fiber coating materials, LED lenses, lens covers, and so forth. Moreover, use as a modifier for another resin is also possible.

Various molded articles in which the methacrylic resin and resin composition thereof according to the present embodiment are used may be further subjected to surface functionalization treatment such as anti-reflection treatment, transparent conductive treatment, electromagnetic shielding treatment, or gas barrier treatment.

EXAMPLES

The following provides a more specific description of the content of the present disclosure through examples and comparative examples. However, the present disclosure is not limited to the following examples.

<1. Measurement of Polymerization Conversion Rate>

In the examples and comparative examples, a portion of the polymerization solution was sampled, and the polymerization solution sample was dissolved in chloroform to prepare a 5 mass % solution. n-Decane was added to the solution as an internal standard and then the concentration of residual monomer in the sample was measured by gas chromatography (GC-2010 produced by Shimadzu Corporation) to determine the total mass (a) of residual monomer in the polymerization solution. The polymerization conversion rate (%) was then calculated from the total mass (a) and the total mass (b) of monomer that had been added at the point at which the sample was taken using an equation $(b-a)/b \times 100$.

<2. Analysis of Structural Units>

Structural units in methacrylic resins produced in the examples and comparative examples were identified and the amounts thereof were calculated by $^1$H-NMR measurement and $^{13}$C-NMR measurement in each of the examples and comparative examples unless otherwise specified. The measurement conditions in the $^1$H-NMR measurement and the $^{13}$C-NMR measurement were as follows.

Measurement apparatus: JNM-ECZ400S produced by JEOL Ltd.
Measurement solvent: $CDCl_3$ or $DMSO-d_6$
Measurement temperature: 40° C.

<3. Measurement of Molecular Weight and Molecular Weight Distribution>

The weight average molecular weight (Mw) and number average molecular weight (Mn) of methacrylic resins produced in the examples and comparative examples were measured using the following device and conditions.

Measurement device: Gel permeation chromatograph (HLC-8320GPC) produced by Tosoh Corporation
Measurement conditions
Column: TSK guard column Super H-H×1, TSK gel Super HM-M×2, TSK gel Super H2500×1; connected in series in this order
Column temperature: 40° C.
Developing solvent: Tetrahydrofuran; 0.6 mL/min flow rate; 0.1 g/L of 2,6-di-t-butyl-4-methylphenol (BHT) added as internal standard
Detector: Refractive index (RI) detector
Detection sensitivity: 3.0 mV/min
Sample: Solution of 0.02 g of methacrylic resin in 20 mL of tetrahydrofuran
Injection volume: 10 μL
Standard samples for calibration curve: Following 10 types of polymethyl methacrylate (PMMA Calibration Kit M-M-10 produced by Polymer Laboratories Ltd.) of differing molecular weight, each having a known monodisperse weight peak molecular weight
Weight Peak Molecular Weight (Mp)
Standard sample 1: 1,916,000
Standard sample 2: 625,500
Standard sample 3: 298,900
Standard sample 4: 138,600
Standard sample 5: 60,150
Standard sample 6: 27,600
Standard sample 7: 10,290
Standard sample 8: 5,000
Standard sample 9: 2,810
Standard sample 10: 850

The RI detection intensity was measured with respect to the elution time of the methacrylic resin under the conditions set forth above.

The weight average molecular weight (Mw) and the number average molecular weight (Mn) of the methacrylic resin were determined based on a calibration curve obtained through measurement of the calibration curve standard samples. The values of Mw and Mn were used to determine the molecular weight distribution (Mw/Mn).

<4. Glass Transition Temperature>

The glass transition temperature (Tg) (° C.) of a methacrylic resin was measured in accordance with JIS-K7121.

First, specimens were obtained by cutting approximately 10 mg from a sample at four points (four locations) after the sample has been conditioned (left for 1 week at 23° C.) in a standard state (23° C., 65% RH).

A DSC curve was then plotted using a differential scanning calorimeter (Diamond DSC produced by PerkinElmer Japan) under a nitrogen gas flow rate of 25 mL/min while heating the specimen from room temperature (23° C.) to 200° C. at 10° C./min (primary heating), holding the specimen at 200° C. for 5 minutes to completely melt the specimen, cooling the specimen from 200° C. to 40° C. at 10° C./min, holding the specimen at 40° C. for 5 minutes, and then reheating the specimen under the same heating conditions (secondary heating). The glass transition temperature (Tg) (° C.) was measured as the intersection point (mid-point glass transition temperature) of a stair-shaped change section of the DSC curve during the secondary heating and a straight line that was equidistant in a vertical axis direction from each extrapolated baseline. Four points were measured per sample and the arithmetic mean (rounded to nearest whole number beyond the decimal point) for the four points was taken to be the measured value.

<5. Measurement of Photoelastic Coefficient $C_R$>

Each of the methacrylic resins obtained in the examples and comparative examples was formed into a pressed film using a vacuum compression molding machine to obtain a measurement sample.

The specific sample preparation conditions were as follows. A vacuum compression molding machine (SFV-30 produced by Shinto Metal Industries Corporation) was used to perform pre-heating for 10 minutes at 260° C. under vacuum (approximately 10 kPa) and to subsequently compress the resin for 5 minutes at 260° C. and approximately 10 MPa. The vacuum and press pressure were released, and then the resin was transferred to a compression molding machine for cooling in which the resin was cooled and solidified. The resultant pressed film was cured for at least 24 hours in a constant temperature and constant humidity chamber adjusted to a temperature of 23° C. and a humidity of 60%, and then a measurement specimen (thickness: approximately 150 μm, width: 6 mm) was cut out therefrom.

The photoelastic coefficient $C_R$ ($Pa^{-1}$) was measured using a birefringence measurement device that is described in detail in Polymer Engineering and Science 1999, 39, 2349-2357.

The film-shaped specimen was set in a film tensing device (produced by Imoto Machinery Co., Ltd.) set up in the same constant temperature and constant humidity chamber such that the chuck separation was 50 mm. Next, a birefringence measurement device (RETS-100 produced by Otsuka Electronics Co., Ltd.) was set up such that a laser light path of the device was positioned in a central portion of the film. The birefringence of the specimen was measured while applying tensile stress with a strain rate of 50%/min (chuck separation: 50 mm, chuck movement speed: 5 mm/min).

The photoelastic coefficient ($C_R$) ($Pa^{-1}$) was calculated from the relationship between the absolute value (|Δn|) of the measured birefringence and the tensile stress ($\sigma_R$) by making a least squares approximation and then determining the gradient of the resultant straight line. This calculation was performed using data in a tensile stress range of 2.5 MPa≤$\sigma_R$≤10 MPa.

$$C_R=|\Delta n|/\sigma_R$$

Note that the absolute value (|Δn|) of birefringence is a value shown below.

$$|\Delta n|=|nx-ny|$$

(nx: refractive index of tension direction; ny: refractive index of in-plane direction perpendicular to tension direction)

<6. Measurement of Amount of Methanol-Soluble Content and Amount of Methanol-Insoluble Content>

With respect to each methacrylic resin obtained in the examples and comparative examples, 5 g of the methacrylic resin was dissolved in 100 mL of chloroform, and the resultant solution was added into a dropping funnel and was then dripped into 1 L of methanol stirred by a stirrer over approximately 1 hour to cause re-precipitation. After the entire solution had been dripped into the methanol and then been left for 1 hour at rest, suction filtration was performed using a membrane filter (T05A090C produced by Advantec Toyo Kaisha, Ltd.) as a filter.

The filtration residue was vacuum dried for 16 hours at 60° C. and the dried product was taken to be methanol-insoluble content. Additionally, solvent was removed from the filtrate using a rotary evaporator with a bath temperature of 40° C. and a degree of vacuum that was gradually reduced from an initial setting of 390 Torr to a final level of 30 Torr. Soluble content remaining in the rotary evaporator flask was collected and taken to be methanol-soluble content.

The mass of the methanol-insoluble content and the mass of the methanol-soluble content were weighed and then the amount of the methanol-soluble content was calculated as a proportion (mass %; proportion of methanol-soluble content) relative to the total amount (100 mass %) of the methanol-soluble content and the methanol-insoluble content.

<7. Content of Components Having Molecular Weight of 2,000 or Less and Content of Components Exhibiting Light Absorption at Wavelength of 400 nm in Methanol-Soluble Content>

The soluble content in the re-precipitation described above was used to prepare a THF solution of 0.030 g/mL in concentration. The THF solution was subjected to GPC measurement in accordance with "3. Measurement of molecular weight and molecular weight distribution" using a UV detector (UV-8020 produced by Tosoh Corporation; tungsten lamp set to wavelength of 400 nm used as illuminant) as a detector in addition to the RI detector.

The peak elution time of standard PMMA having a weight peak molecular weight of 2,000 was separately measured and was used to calculate the elution area for molecular weights of 2,000 and less from the measurement results of the RI detector. The content (mass %) of components having a molecular weight of 2,000 or less in the methanol-soluble content was calculated from the ratio of this elution area relative to the total peak area.

In addition, a calibration curve for N-phenylmaleimide at a UV detector wavelength of 400 nm was prepared. The amount of components that exhibit light absorption at a wavelength of 400 nm was determined in terms of N-phenylmaleimide from the total elution peak area for the methanol-soluble content according to the UV detector, and the content (mass %) of components that exhibit light absorption at a wavelength of 400 nm in the methanol-soluble content was calculated.

Moreover, the content (mass %) of N-phenylmaleimide monomer in the methanol-soluble content was calculated through measurement by gas chromatography in accordance with "1. Measurement of polymerization conversion rate".

<8. Measurement of Moled Piece Color Tone>

Methacrylic resins obtained in the subsequently described examples and comparative examples were used to prepare strip-shaped specimens of 3 mm in thickness by 12 mm in width by 124 mm in length in an injection molding machine (AUTO SHOT C Series MODEL 15A produced by Fanuc Corporation) under conditions of a molding temperature of 250° C. and a mold temperature of 90° C.

(8-1) Measurement of YI and Total Light Transmittance at Optical Path Length of 3 mm A spectrophotometer (SD-5000 produced by Nippon Denshoku Industries Co., Ltd.) was used to measure the yellowness index (YI) (measured in accordance with JIS K7373) and total light transmittance (%) (measured in accordance with JIS K7361-1) of an obtained moled piece with a D65 illuminant, a 10° field of view, and an optical path length of 3 mm by clamping the molded piece such that the illuminant passed in a thickness direction of the moled piece. This measurement was performed three times and an average value of these measurements was used.

(8-2) Measurement of YI and Y Value at Optical Path Length of 80 mm

An obtained moled piece was cut to 80 mm in the longitudinal direction and was then polished at both end surfaces perpendicular to the longitudinal direction using a polishing machine (PLA-BEAUTY produced by Megaro Technica Co., Ltd.) with a cutter rotation speed of 8,500 rpm and a feed rate of 1 m/min.

A color difference meter (COH300A produced by Nippon Denshoku Industries Co., Ltd.) was used to measure the YI and a Y value (indicator of luminous transmittance) of the moled piece that had been subjected to polishing with a C illuminant, a 20 field of view, and an optical path length of 80 mm by setting the moled piece with the polished end surfaces perpendicular relative to the illuminant.

[Raw Materials]

Raw materials used in the subsequently described examples and comparative examples were as shown below.

[[Monomers]]

Methyl methacrylate: Produced by Asahi Kasei Corporation

N-Phenylmaleimide (phMI): Produced by Nippon Shokubai Co., Ltd.

N-Cyclohexylmaleimide (chMI): Produced by Nippon Shokubai Co., Ltd.

Styrene (St): Produced by Asahi Kasei Corporation

[[Polymerization initiators]]

1,1-Di(t-butylperoxy)cyclohexane: PERHEXA C produced by NOF Corporation t-Butylperoxy isopropyl monocarbonate: PERBUTYL I produced by NOF Corporation

[[Chain Transfer Agents]]

n-Octyl mercaptan: Produced by Kao Corporation n-Dodecyl mercaptan: Produced by Kao Corporation

[[Antioxidants]]

Pentaerythritol tetrakis[3-(3',5'-di-tert-butyl-4'-hydroxyphenyl)propionate]: Irganox 1010 produced by BASF Tris(2,4-di-t-butylphenyl) phosphite: Irgafos 168 produced by BASF

[Other Additives]

Acetic anhydride: Produced by Wako Pure Chemical Industries, Ltd.

Example 1

A mixed monomer solution was obtained by measuring out 340.7 kg of methyl methacrylate (hereinafter, denoted as "MMA"), 39.6 kg of N-phenylmaleimide (hereinafter, denoted as "phMI"), 59.7 kg of N-cyclohexylmaleimide (hereinafter, denoted as "chMI"), 0.275 kg of n-octyl mercaptan as a chain transfer agent, and 236.9 kg of meta-xylene (hereinafter, denoted as "mXy"), adding these materials into a 1.25 $m^3$ reactor equipped with an impeller and a temperature controller functioning through use of a jacket, and then stirring these materials.

Next, 123.1 kg of mXy was measured out to prepare supplemental solvent in a first tank.

Moreover, 110.0 kg of MMA and 90.0 kg of mXy were measured out in a second tank and were stirred to obtain a supplemental MMA solution.

The contents of the reactor were subjected to bubbling with nitrogen for 1 hour at a rate of 30 L/min, and the first and second tanks were each subjected to bubbling with nitrogen for 30 minutes at a rate of 10 L/min to remove dissolved oxygen.

Thereafter, steam was blown into the jacket to raise the solution temperature in the reactor to 128° C., and a polymerization initiator solution of 0.371 kg of 1,1-di(t-butylperoxy)cyclohexane dissolved in 3.004 kg of mXy was added at a rate of 1 kg/h under stirring at 50 rpm to initiate polymerization.

The solution temperature inside the reactor during polymerization was controlled to 128±2° C. through temperature adjustment using the jacket. Once 30 minutes had passed from the start of polymerization, the addition rate of the initiator solution was reduced to 0.25 kg/h and mXy was added from the first tank for 3.5 hours at a rate of 35.17 kg/h.

Next, once 4 hours had passed from the start of polymerization, the addition rate of the initiator solution was increased to 0.75 kg/h and the supplemental MMA solution was added from the second tank for 2 hours at a rate of 100 kg/h.

Moreover, the addition rate of the initiator solution was reduced to 0.5 kg/h once 6 hours had passed from the start of polymerization and addition of the initiator solution was stopped once 7 hours had passed from the start of polymerization.

A polymerization solution containing a methacrylic resin was obtained 8 hours after the start of polymerization.

The polymer solution was sampled 3 hours after the start of polymerization, 4 hours after the start of polymerization, and 8 hours after the start of polymerization (i.e., at the end of polymerization), and the polymerization conversion rates of monomers were analyzed from the concentrations of residual monomers. The polymerization conversion rate was 87.7% for MMA, 84.6% for phMI, and 74.7% for chMI after 3 hours, 92.9% for MMA, 90.3% for phMI, and 84.1% for chMI after 4 hours, and 92.2% for MMA, 99.4% for phMI, and 98.3% for chMI after 8 hours.

Next, the obtained polymer solution was introduced into a twin screw extruder equipped with a plurality of vents for devolatilization in order to perform devolatilization of the solution. In the twin screw extruder, the obtained copolymer solution was fed at a rate of 10 kg/h in terms of resin, and conditions of a barrel temperature of 260° C., a screw rotation speed of 150 rpm, and a degree of vacuum of 10 Torr to 40 Torr were adopted. The resin that had been devolatilized by the twin screw extruder was extruded from a strand die, cooled by water, and then pelletized to obtain a methacrylic resin.

The chemical composition of the resultant pellet-form polymerized product was confirmed to include structural units derived from the monomers MMA, phMI, and chMI in proportions of 80.9 mass %, 7.7 mass %, and 11.4 mass %, respectively. Moreover, the weight average molecular weight was 149,000 and Mw/Mn was 2.26. Other physical properties are shown in Table 1.

Example 2

A methacrylic resin was obtained in the same way as in Example 1 with the exception that the supplemental MMA solution was added from the second tank for 2 hours once 3 hours had passed from the start of polymerization.

The polymer solution was sampled 3 hours after the start of polymerization and 8 hours after the start of polymerization (i.e., at the end of polymerization), and the polymerization conversion rates of monomers were analyzed from the concentrations of residual monomers. The polymerization conversion rate was 87.7% for MMA, 84.6% for phMI, and 74.7% for chMI after 3 hours, and 94.0% for MMA, 99.3% for phMI, and 97.2% for chMI after 8 hours.

The chemical composition of the resultant pellet-form polymerized product was confirmed to include structural units derived from the monomers MMA, phMI, and chMI in proportions of 81.3 mass %, 7.6 mass %, and 11.1 mass %, respectively. Moreover, the weight average molecular weight was 152,000 and Mw/Mn was 2.34. Other physical properties are shown in Table 1.

Example 3

A methacrylic resin was obtained in the same way as in Example 1 with the exception that the supplemental MMA solution was added from the second tank for 2 hours once 2.5 hours had passed from the start of polymerization.

The polymer solution was sampled 2.5 hours after the start of polymerization and 8 hours after the start of polymerization (i.e., at the end of polymerization), and the polymerization conversion rates of monomers were analyzed from the concentrations of residual monomers. The polymerization conversion rate was 82.1% for MMA, 79.7% for phMI, and 68.8% for chMI after 2.5 hours, and 95.0% for MMA, 99.1% for phMI, and 97.1% for chMI after 8 hours.

The chemical composition of the resultant pellet-form polymerized product was confirmed to include structural units derived from the monomers MMA, phMI, and chMI in proportions of 81.5 mass %, 7.5 mass %, and 11.0 mass %, respectively. Moreover, the weight average molecular weight was 153,000 and Mw/Mn was 2.39. Other physical properties are shown in Table 1.

Example 4

A mixed monomer solution was obtained by measuring out 335.5 kg of MMA, 37.4 kg of phMI, 67.1 kg of chMI, 0.300 kg of n-octyl mercaptan as a chain transfer agent, and 236.9 kg of mXy, adding these materials into a 1.25 m$^3$ reactor equipped with an impeller and a temperature controller functioning through use of a jacket, and then stirring these materials.

Next, 123.1 kg of mXy was measured out to prepare supplemental solvent in a first tank Moreover, 110.0 kg of MMA and 90.0 kg of mXy were measured out in a second tank and were stirred to obtain a supplemental MMA solution.

The contents of the reactor were subjected to bubbling with nitrogen for 1 hour at a rate of 30 L/min, and the first and second tanks were each subjected to bubbling with nitrogen for 30 minutes at a rate of 10 L/min to remove dissolved oxygen.

Thereafter, steam was blown into the jacket to raise the solution temperature in the reactor to 123° C., and a polymerization initiator solution of 0.481 kg of 1,1-di(t-butylperoxy)cyclohexane dissolved in 2.644 kg of mXy was added at a rate of 1 kg/h under stirring at 50 rpm to initiate polymerization.

The solution temperature inside the reactor during polymerization was controlled to 123±2° C. through temperature adjustment using the jacket. Once 30 minutes had passed from the start of polymerization, the addition rate of the initiator solution was reduced to 0.25 kg/h and mXy was added from the first tank for 3.5 hours at a rate of 35.17 kg/h.

Next, once 4 hours had passed from the start of polymerization, the addition rate of the initiator solution was increased to 0.75 kg/h and the supplemental MMA solution was added from the second tank for 2 hours at a rate of 100 kg/h.

Moreover, the addition rate of the initiator solution was reduced to 0.25 kg/h once 6 hours had passed from the start of polymerization and addition of the initiator solution was stopped once 7 hours had passed from the start of polymerization.

A polymerization solution containing a methacrylic resin was obtained 8 hours after the start of polymerization.

The polymer solution was sampled 4 hours after the start of polymerization and 8 hours after the start of polymerization (i.e., at the end of polymerization), and the polymerization conversion rates of monomers were analyzed from the concentrations of residual monomers. The polymerization conversion rate was 94.8% for MMA, 92.7% for phMI, and 88.3% for chMI after 4 hours, and 92.0% for MMA, 99.1% for phMI, and 97.8% for chMI after 8 hours.

Next, the obtained polymer solution was fed into a concentrating device comprising a tubular heat exchanger and a vaporization tank that had been pre-heated to 250° C. to perform devolatilization of the solution. The degree of vacuum in the vaporization tank was set as 10 Torr to 15 Torr. Resin flowing downstream from the vaporization tank was forced out by a screw pump, extruded from a strand die, cooled by water, and then pelletized to obtain a methacrylic resin.

The chemical composition of the resultant pellet-form polymerized product was confirmed to include structural units derived from the monomers MMA, phMI, and chMI in proportions of 80.0 mass %, 7.2 mass %, and 12.8 mass %, respectively. Moreover, the weight average molecular weight was 137,000 and Mw/Mn was 2.32. Other physical properties are shown in Table 1.

Example 5

A methacrylic resin composition was obtained in the same way as in Example 4 with the exception that 0.275 kg of Irganox 1010 and 0.825 kg of Irgafos 168 were added, stirred, and mixed as antioxidants once 8 hours had passed from the start of polymerization, and then devolatilization was performed.

The chemical composition of the resultant pellet-form composition was confirmed to include structural units derived from the monomers MMA, phMI, and chMI in proportions of 80.0 mass %, 7.2 mass %, and 12.8 mass %, respectively. Moreover, the weight average molecular weight was 139,000 and Mw/Mn was 2.28. Other physical properties are shown in Table 1.

Comparative Example 1

A mixed monomer solution was obtained by measuring out 450.7 kg of MMA, 39.6 kg of phMI, 59.7 kg of chMI, 0.413 kg of n-octyl mercaptan as a chain transfer agent, and 450.0 kg of mXy, adding these materials into a 1.25 m$^3$ reactor equipped with an impeller and a temperature controller functioning through use of a jacket, and then stirring these materials.

The contents of the reactor were subjected to bubbling with nitrogen for 1 hour at a rate of 30 L/min to remove dissolved oxygen.

Thereafter, steam was blown into the jacket to raise the solution temperature in the reactor to 125° C., and a polymerization initiator solution of 0.231 kg of 1,1-di(t-butylperoxy)cyclohexane dissolved in 2.769 kg of mXy was added at a rate of 0.5 kg/h under stirring at 50 rpm to initiate polymerization.

The solution temperature inside the reactor during polymerization was controlled to 125±2° C. through temperature adjustment using the jacket. The initiator solution was added at a constant rate and addition thereof was stopped once 6 hours had passed from the start of polymerization.

A polymerization solution containing a methacrylic resin was obtained 8 hours after the start of polymerization.

The polymer solution was sampled 8 hours after the start of polymerization (i.e., at the end of polymerization) and the polymerization conversion rates of monomers were analyzed from the concentrations of residual monomers. The polymerization conversion rate was 95.7% for MMA, 96.6% for phMI, and 93.3% for chMI after 8 hours.

Next, the obtained polymer solution was fed into a twin screw extruder equipped with a plurality of vents for devolatilization in order to perform devolatilization of the solution. In the twin screw extruder, the obtained copolymer solution was fed at a rate of 10 kg/h in terms of resin, and conditions of a barrel temperature of 260° C., a screw rotation speed of 150 rpm, and a degree of vacuum of 10 Torr to 40 Torr were adopted. The resin that had been devolatilized by the twin screw extruder was extruded from a strand die, cooled by water, and then pelletized to obtain a methacrylic resin.

The chemical composition of the resultant pellet-form polymerized product was confirmed to include structural units derived from the monomers MMA, phMI, and chMI in proportions of 82.1 mass %, 7.3 mass %, and 10.6 mass %, respectively. Moreover, the weight average molecular weight was 148,000 and Mw/Mn was 2.31. Other physical properties are shown in Table 1.

Comparative Example 2

A mixed monomer solution was obtained by measuring out 140.0 kg of MMA, 100.0 kg of chMI, and 250 kg of toluene, adding these materials into a 1.25 m³ reactor equipped with an impeller and a temperature controller functioning through use of a jacket, and then stirring these materials.

Next, a supplemental mixed monomer solution was obtained by measuring out 82.5 kg of MMA, 25.0 kg of chMI, 35.0 kg of styrene, and 200.0 kg of toluene, adding these materials into a first tank, and stirring these materials.

Moreover, another supplemental mixed monomer solution was obtained by measuring out 82.5 kg of MMA, 35.0 kg of styrene, and 50.0 kg of toluene, adding these materials into a second tank, and stirring these materials.

The contents of the reactor were subjected to bubbling with nitrogen for 1 hour at a rate of 30 L/min, and the contents of the first and second tanks were each subjected to bubbling with nitrogen for 30 minutes at a rate of 10 L/min to remove dissolved oxygen.

Thereafter, steam was blown into the jacket to raise the solution temperature in the reactor to 110° C., a polymerization initiator solution of 0.20 kg of t-butylperoxy isopropyl monocarbonate dissolved in 0.8 kg of toluene was added into the reactor under stirring at 50 rpm to initiate polymerization, and a polymerization initiator solution of 2.30 kg of t-butylperoxy isopropyl monocarbonate dissolved in 4.70 kg of toluene was added for 3.5 hours at a rate of 2 kg/h.

Moreover, the contents of the first tank were added at a constant rate for 3.5 hours after the start of polymerization, the contents of the second tank were subsequently added at a constant rate for 3.5 hours, and a polymerization solution containing a methacrylic resin was obtained 7 hours after the start of polymerization.

The solution temperature inside the reactor during polymerization was controlled to 110±2° C. through temperature adjustment using the jacket.

Next, the obtained polymer solution was introduced into a twin screw extruder equipped with a plurality of vents for devolatilization in order to perform devolatilization of the solution. In the twin screw extruder, the obtained copolymer solution was fed at a rate of 10 kg/h in terms of resin, and conditions of a barrel temperature of 260° C., a screw rotation speed of 150 rpm, and a degree of vacuum of 10 Torr to 40 Torr were adopted. The resin that had been devolatilized by the twin screw extruder was extruded from a strand die, cooled by water, and then pelletized to obtain a methacrylic resin.

The chemical composition of the resultant pellet-form polymerized product was confirmed to include structural units derived from the monomers MMA, chMI, and styrene in proportions of 54.1 mass %, 28.0 mass %, and 17.9 mass %, respectively. Moreover, the weight average molecular weight was 108,000 and Mw/Mn was 2.83. Other physical properties are shown in Table 1.

Comparative Example 3

A mixed monomer solution was obtained by measuring out 450.0 kg of MMA, 50.0 kg of phMI, 500 kg of toluene, 2.0 kg of n-dodecyl mercaptan, and 2.0 kg of acetic anhydride, adding these materials into a 1.25 m³ reactor equipped with an impeller and a temperature controller functioning through use of a jacket, and then stirring these materials. The contents of the reactor were subjected to bubbling with nitrogen for 1 hour at a rate of 30 L/min to remove dissolved oxygen.

Thereafter, steam was blown into the jacket to raise the solution temperature in the reactor to 110° C., 1.5 kg of t-butylperoxy isopropyl monocarbonate was added into the reactor under stirring at 50 rpm to initiate polymerization, and polymerization was continued for 15 hours.

The solution temperature inside the reactor during polymerization was controlled to 110±2° C. through temperature adjustment using the jacket.

Next, the obtained polymer solution was introduced into a twin screw extruder equipped with a plurality of vents for devolatilization in order to perform devolatilization of the solution. In the twin screw extruder, the obtained copolymer solution was fed at a rate of 10 kg/h in terms of resin, and conditions of a barrel temperature of 260° C., a screw rotation speed of 150 rpm, and a degree of vacuum of 10 Torr to 40 Torr were adopted. The resin that had been devolatilized by the twin screw extruder was extruded from a strand die, cooled by water, and then pelletized to obtain a methacrylic resin.

The chemical composition of the resultant pellet-form polymerized product was confirmed to include structural units derived from the monomers MMA and phMI in proportions of 89.9 mass % and 10.1 mass %, respectively. Moreover, the weight average molecular weight was 152,000 and Mw/Mn was 2.58. Other physical properties are shown in Table 1.

Comparative Example 4

A methacrylic resin was obtained in the same way as in Example 1 with the exception that the supplemental MMA solution was added from the second tank for 2 hours once 2 hours had passed from the start of polymerization.

The polymer solution was sampled 2 hours after the start of polymerization and 8 hours after the start of polymerization (i.e., at the end of polymerization), and the polymerization conversion rates of monomers were analyzed from the concentrations of residual monomers. The polymerization conversion rate was 76.3% for MMA, 73.7% for phMI, and 62.1% for chMI after 2 hours, and 96.2% for MMA, 98.9% for phMI, and 96.8% for chMI after 8 hours.

The chemical composition of the resultant pellet-form polymerized product was confirmed to include structural units derived from the monomers MMA, phMI, and chMI in proportions of 81.7 mass %, 7.4 mass %, and 10.9 mass %, respectively. Moreover, the weight average molecular weight was 156,000 and Mw/Mn was 2.36. Other physical properties are shown in Table 1.

TABLE 1

|  |  |  |  |  | Example 1 | | | | Example 2 | | | | Example 3 | | |
|---|---|---|---|---|---|---|---|---|---|---|---|---|---|---|---|
| Methacrylic resin production method | 1 | Polymerization conversion rate | [%] | | | MMA | phMI | chMI | | MMA | phMI | chMI | | MMA | phMI | chMI |
| | | | | 3 h | 87.7 | 84.6 | 74.7 | 3 h | 87.7 | 84.6 | 74.7 | 2.5 h | 82.1 | 79.7 | 68.8 |
| | | | | 4 h | 92.9 | 90.3 | 84.1 | | | | | | | | |
| | | | | 8 h | 92.2 | 99.4 | 98.3 | 8 h | 94.0 | 99.3 | 97.2 | 8 h | 95.0 | 99.1 | 97.1 |
| Methacrylic resin | 2 | Composition of structural units | [Mass %] | MMA | | 80.9 | | MMA | | 81.3 | | MMA | | 81.5 | |
| | | | | phMI | | 7.7 | | phMI | | 7.6 | | phMI | | 7.5 | |
| | | | | chMI | | 11.4 | | chMI | | 11.1 | | chMI | | 11.0 | |
| | 3 | Molecular weight | Mw | [—] | | 149,000 | | | | 152,000 | | | | 153,000 | |
| | | | Mn | [—] | | 66,000 | | | | 65,000 | | | | 64,000 | |
| | | | Mw/Mn | [—] | | 2.26 | | | | 2.34 | | | | 2.39 | |
| | 4 | | Tg | [° C.] | | 134 | | | | 134 | | | | 134 | |
| | 5 | | $C_g$ | [Pa$^{-1}$] | | $0.4 \times 10^{-12}$ | | | | $0.3 \times 10^{-12}$ | | | | $0.3 \times 10^{-12}$ | |
| | 6 | Proportion of methanol-soluble content | | [Mass %] | | 3.9 | | | | 4.2 | | | | 4.5 | |
| | 7 | Methanol-soluble content | Amount of components having molecular weight of 2.000 or less | [Mass %] | | 18 | | | | 16 | | | | 25 | |
| | | | Amount of components exhibiting light absorption at wavelength of 400 nm | [Mass %] | | 0.76 | | | | 0.92 | | | | 1.48 | |
| | | | Amount of phMI | [Mass %] | | 0.06 | | | | 0.07 | | | | 0.08 | |
| | 8-1 | Shaped piece color tone (3 mm optical path length) | YI | [—] | | 1.4 | | | | 1.4 | | | | 1.5 | |
| | | | Total light transmittance | [%] | | 92.9 | | | | 92.7 | | | | 92.1 | |
| | 8-2 | Shaped piece color tone (80 mm optical path length) | YI | [—] | | 18.5 | | | | 19.2 | | | | 20.1 | |
| | | | Y value | [—] | | 66.3 | | | | 67.8 | | | | 66.1 | |

|  |  |  |  | Example 4 | | | | Example 5 | | | |
|---|---|---|---|---|---|---|---|---|---|---|---|
| Methacrylic resin production method | 1 | Polymerization conversion rate | [%] | | MMA | phMI | chMI | | MMA | phMI | chMI |
| | | | | 3 h | | | | 3 h | | | |
| | | | | 4 h | 94.8 | 92.7 | 88.3 | 4 h | 94.8 | 92.7 | 88.3 |
| | | | | 8 h | 92.0 | 99.1 | 97.8 | 8 h | 92.0 | 99.1 | 97.8 |
| Methacrylic resin | 2 | Composition of structural units | [Mass %] | MMA | | 80.0 | | MMA | | 80.0 | |
| | | | | phMI | | 7.2 | | phMI | | 7.2 | |
| | | | | chMI | | 12.8 | | chMI | | 12.8 | |
| | 3 | Molecular weight | Mw | [—] | | 137,000 | | | | 139,000 | |
| | | | Mn | [—] | | 59,000 | | | | 61,000 | |
| | | | Mw/Mn | [—] | | 2.32 | | | | 2.28 | |
| | 4 | | Tg | [° C.] | | 135 | | | | 135 | |
| | 5 | | $C_g$ | [Pa$^{-1}$] | | $0.1 \times 10^{-12}$ | | | | $0.1 \times 10^{-12}$ | |
| | 6 | Proportion of methanol-soluble content | | [Mass %] | | 3.2 | | | | 2.6 | |

TABLE 1-continued

| | | | | | | | | |
|---|---|---|---|---|---|---|---|---|
| | 7 | Methanol-soluble content | Amount of components having molecular weight of 2,000 or less | [Mass %] | | 25 | | 23 |
| | | | Amount of components exhibiting light absorption at wavelength of 400 nm | [Mass %] | | 0.95 | | 0.62 |
| | | | Amount of phMI | [Mass %] | | 0.05 | | 0.04 |
| | 8-1 | Shaped piece color tone (3 mm optical path length) | YI | [—] | | 1.4 | | 1.3 |
| | | | Total light transmittance | [%] | | 92.5 | | 92.8 |
| | 8-2 | Shaped piece color tone (80 mm optical path length) | YI | [—] | | 19.5 | | 16.5 |
| | | | Y value | [—] | | 69.7 | | 74.5 |

| | | | | | Comparative Example 1 | | Comparative Example 2 | | |
|---|---|---|---|---|---|---|---|---|---|
| Methacrylic resin production method | 1 | Polymerization conversion rate | | [%] | MMA phMI chMI | | MMA chMI St | | |
| | | | | | | | 3.5 h 77.6 95.0 50.1 | | |
| | | | | | 8 h 95.7 96.6 93.3 | | 7 h 86.6 99.6 91.0 | | |
| Methacrylic resin | 2 | Composition of structural units | | [Mass %] | MMA 82.1 | | MMA 54.1 | | |
| | | | | | phMI 7.3 | | chMI 28.0 | | |
| | | | | | chMI 10.6 | | St 17.9 | | |
| | 3 | Molecular weight | Mw | [—] | 148,000 | | 108,000 | | |
| | | | Mn | [—] | 64,000 | | 38,200 | | |
| | | | Mw/Mn | [—] | 2.31 | | 2.83 | | |
| | 4 | | Tg | [° C.] | 134 | | 135 | | |
| | 5 | | $C_g$ | [Pa$^{-1}$] | $0.2 \times 10^{-12}$ | | $2.6 \times 10^{-12}$ | | |
| | 6 | Proportion of methanol-soluble content | | [Mass %] | 2.4 | | 6.7 | | |
| | 7 | Methanol-soluble content | Amount of components having molecular weight of 2,000 or less | [Mass %] | 59 | | 65 | | |
| | | | Amount of components exhibiting light absorption at wavelength of 400 nm | [Mass %] | 2.92 | | 0.5 | | |
| | | | Amount of phMI | [Mass %] | 0.4 | | — | | |
| | 8-1 | Shaped piece color tone (3 mm optical path length) | YI | [—] | 2.3 | | 1.6 | | |
| | | | Total light transmittance | [%] | 92.3 | | 91.3 | | |
| | 8-2 | Shaped piece color tone (80 mm optical path length) | YI | [—] | 32.1 | | Not measured | | |
| | | | Y value | [—] | 59.9 | | Not measured | | |

| | | | | | Comparative Example 3 | | Comparative Example 4 | | |
|---|---|---|---|---|---|---|---|---|---|
| Methacrylic resin production method | 1 | Polymerization conversion rate | | [%] | MMA phMI | | MMA phMI chMI | | |
| | | | | | | | 2 h 76.3 73.7 62.1 | | |
| | | | | | 15 h 98.8 99.7 | | 8 h 96.2 98.9 96.8 | | |
| Methacrylic resin | 2 | Composition of structural units | | [Mass %] | MMA 89.9 | | MMA 81.7 | | |
| | | | | | phMI 10.1 | | phMI 7.4 | | |
| | | | | | | | chMI 10.9 | | |
| | 3 | Molecular weight | Mw | [—] | 152,000 | | 156,000 | | |
| | | | Mn | [—] | 59,000 | | 66,000 | | |
| | | | Mw/Mn | [—] | 2.58 | | 2.36 | | |
| | 4 | | Tg | [° C.] | 125 | | 134 | | |
| | 5 | | $C_g$ | [Pa$^{-1}$] | $2.7 \times 10^{-12}$ | | $0.3 \times 10^{-12}$ | | |
| | 6 | Proportion of methanol-soluble content | | [Mass %] | 5.8 | | 5.2 | | |
| | 7 | Methanol-soluble content | Amount of components having molecular weight of 2,000 or less | [Mass %] | 48 | | 32 | | |
| | | | Amount of components exhibiting light absorption at wavelength of 400 nm | [Mass %] | 2.42 | | 2.12 | | |
| | | | Amount of phMI | [Mass %] | 0.02 | | 0.08 | | |
| | 8-1 | Shaped piece color tone (3 mm optical path length) | YI | [—] | 1.8 | | 1.6 | | |
| | | | Total light transmittance | [%] | 92.7 | | 92.1 | | |
| | 8-2 | Shaped piece color tone (80 mm optical path length) | YI | [—] | 24.3 | | 23.4 | | |
| | | | Y value | [—] | 58.2 | | 64.3 | | |

As shown in Table 1, a molded article obtained with the methacrylic resin according to the present embodiment has a low YI for a long optical path, excellent color tone, and high transmittance, and thus can suitably be used in optical component applications for light guide plates and the like and automotive component applications for tail lamps, meter covers, head lamps, and the like.

INDUSTRIAL APPLICABILITY

The presently disclosed methacrylic resin has high heat resistance, highly controlled birefringence, and excellent color tone and transparency.

The presently disclosed methacrylic resin can suitably be used as an optical material in light guide plates, diffuser plates, and polarizing plate protective films used in displays such as liquid-crystal displays, plasma displays, organic EL displays, field emission displays, and rear projection televisions; retardation plates such as quarter-wave plates and half-wave plates; liquid-crystal optical compensation films such as viewing angle control films; display front plates; display substrates; lenses; transparent conductive substrates such as touch panels and transparent substrates used in solar cells; applications in the fields of optical communication systems, optical switching systems, and optical measurement systems, or in optical products such as head mounted displays and liquid-crystal projectors for waveguides, lenses, lens arrays, optical fibers, and optical fiber coating materials; LED lenses; lens covers and the like, household goods, OA equipment, AV equipment, battery fittings, and lighting equipment; automotive component applications for tail lamps, meter covers, head lamps, light guide rods, lenses, car navigation system front plates, and the like; housing applications; and sanitary applications as a sanitary ware alternative or the like.

The invention claimed is:

1. A production method for a methacrylic resin, comprising performing radical polymerization, in a solvent, of two or more monomer components including a methacrylic acid ester monomer and an N-substituted maleimide monomer, wherein
a portion of the N-substituted maleimide monomer and a portion of the methacrylic acid ester monomer are first copolymerized, and then a remaining portion of the N-substituted maleimide monomer and a remaining portion of the methacrylic acid ester monomer are added,
the amount of the remaining portion of the N-substituted maleimide monomer, when the total used amount of the N-substituted maleimide monomer is taken to be 100 mass %, is 10 mass % or less,
the N-substituted maleimide monomer includes an N-substituted maleimide monomer that is N-substituted with an aryl group or an arylalkyl group,
the N-substituted maleimide monomer has a final conversion rate of 97% or more,
the methacrylic acid ester monomer has a final conversion rate of 88% to 96%,
the methacrylic resin comprising, in a main chain thereof, N-substituted maleimide monomer-derived structural units (B) in a proportion of 5 mass % to 40 mass %, wherein
the N-substituted maleimide monomer-derived structural units (B) include a structural unit represented by formula (1)

where, in formula (1), $R^1$ represents an arylalkyl group having a carbon number of 7 to 14 or an aryl group having a carbon number of 6 to 14, $R^2$ and $R^3$ each represent, independently of one another, a hydrogen atom, an alkyl group having a carbon number of 1 to 12, or an aryl group having a carbon number of 6 to 14, and in a case in which $R^2$ is an aryl group, $R^2$ may include a halogen as a substituent,
the methacrylic resin has a glass transition temperature of higher than 120° C. and not higher than 160° C., and
content of components that exhibit light absorption at a wavelength of 400 nm in methanol-soluble content of the methacrylic resin is more than 0 mass % and not more than 2 mass % as calculated in terms of N-phenylmaleimide.

2. The production method according to claim 1, wherein the portion of the methacrylic acid ester monomer and the portion of the N-substituted maleimide monomer are copolymerized and the remaining portion of the methacrylic acid ester monomer is added at a stage at which the methacrylic acid ester monomer has a conversion rate of 80% to 95%.

3. The production method according to claim 1, wherein content of components having a molecular weight of 2,000 or less in the methanol-soluble content of the methacrylic resin is 40 mass % or less.

4. The production method according to claim 1, wherein the methacrylic resin further comprises, in the main chain thereof, methacrylic acid ester monomer units (A) in a proportion of 50 mass % to 95 mass % and other vinyl monomer units (C) that are copolymerizable with a methacrylic acid ester monomer in a proportion of 0 mass % to 20 mass % relative to 100 mass % of the methacrylic resin.

5. The production method according to claim 4, wherein the (B) structural units in the methacrylic resin are included in a proportion of 45 mass % to 100 mass % relative to 100 mass %, in total, of the (B) structural units and the (C) monomer units.

6. The production method according to claim 4, wherein the (C) monomer units in the methacrylic resin include a structural unit of at least one selected from the group consisting of an acrylic acid ester monomer, an aromatic vinyl monomer, and a vinyl cyanide monomer.

7. The production method according to claim 1, wherein the methacrylic resin has a photoelastic coefficient of $-2 \times 10^{-12}$ Pa$^{-1}$ to $+2 \times 10^{-12}$ Pa$^{-1}$.

8. The production method according to claim 1, wherein the radical polymerization is performed while feeding the monomers into the reactor.

9. A production method for a methacrylic resin, comprising performing radical polymerization, in a solvent, of two or more monomer components including a methacrylic acid ester monomer and an N-substituted maleimide monomer, wherein
all of the N-substituted maleimide monomer and a portion of the methacrylic acid ester monomer are first copolymerized, and then a remaining portion of the methacrylic acid ester monomer are added, the N-substituted maleimide monomer includes an N-substituted maleimide monomer that is N-substituted with an aryl group or an arylalkyl group, the N-substituted maleimide monomer has a final conversion rate of 97% or more, the methacrylic acid ester monomer has a final conversion rate of 88% to 96%, methacrylic resin comprising, in a main chain thereof, N-substituted maleimide monomer-derived structural units (B) in a proportion of 5 mass % to 40 mass %, wherein the N-substituted maleimide monomer-derived structural units (B) include a structural unit represented by formula (1)

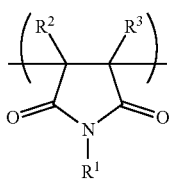

(1)

where, in formula (1), $R^1$ represents an arylalkyl group having a carbon number of 7 to 14 or an aryl group having a carbon number of 6 to 14, $R^2$ and $R^3$ each represent, independently of one another, a hydrogen atom, an alkyl group having a carbon number of 1 to 12, or an aryl group having a carbon number of 6 to 14, and in a case in which $R^2$ is an aryl group, $R^2$ may include a halogen as a substituent, the methacrylic resin has a glass transition temperature of higher than 120° C. and not higher than 160° C., and content of components that exhibit light absorption at a wavelength of 400 nm in methanol-soluble content of the methacrylic resin is more than 0 mass % and not more than 2 mass % as calculated in terms of N-phenylmaleimide.

10. The production method according to claim 9, wherein the portion of the methacrylic acid ester monomer and the N-substituted maleimide monomer are copolymerized and the remaining portion of the methacrylic acid ester monomer is added at a stage at which the methacrylic acid ester monomer has a conversion rate of 80% to 95%.

11. The production method according to claim 9, wherein content of components having a molecular weight of 2,000 or less in the methanol-soluble content of the methacrylic resin is 40 mass % or less.

12. The production method according to claim 9, wherein the methacrylic resin further comprises, in the main chain thereof, methacrylic acid ester monomer units (A) in a proportion of 50 mass % to 95 mass % and other vinyl monomer units (C) that are copolymerizable with a methacrylic acid ester monomer in a proportion of 0 mass % to 20 mass % relative to 100 mass % of the methacrylic resin.

13. The production method according to claim 12, wherein
the (B) structural units in the methacrylic resin are included in a proportion of 45 mass % to 100 mass % relative to 100 mass %, in total, of the (B) structural units and the (C) monomer units.

14. The production method according to claim 12, wherein
the (C) monomer units in the methacrylic resin include a structural unit of at least one selected from the group consisting of an acrylic acid ester monomer, an aromatic vinyl monomer, and a vinyl cyanide monomer.

15. The production method according to claim 9, wherein the methacrylic resin has a photoelastic coefficient of $-2\times10^{-12}$ $Pa^{-1}$ to $+2\times10^{-12}$ $Pa^{-1}$.

16. The production method according to claim 9, wherein the radical polymerization is performed while feeding the monomers into the reactor.

* * * * *